(12) United States Patent
Nakadaira et al.

(10) Patent No.: US 7,843,402 B2
(45) Date of Patent: Nov. 30, 2010

(54) 3D DISPLAYING METHOD, DEVICE AND PROGRAM

(75) Inventors: Atsushi Nakadaira, Suginami-ku (JP); Naobumi Suzuki, Mitaka (JP); Daisuke Ochi, Higashimurayama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 346 days.

(21) Appl. No.: 10/586,263

(22) PCT Filed: Sep. 7, 2005

(86) PCT No.: PCT/JP2005/016448

§ 371 (c)(1),
(2), (4) Date: Jul. 18, 2006

(87) PCT Pub. No.: WO2006/028151

PCT Pub. Date: Mar. 16, 2006

(65) Prior Publication Data

US 2007/0165027 A1      Jul. 19, 2007

(30) Foreign Application Priority Data

Sep. 8, 2004    (JP) ................. 2004-260633

(51) Int. Cl.
*G09G 5/00* (2006.01)
(52) U.S. Cl. .......................... 345/6; 345/690
(58) Field of Classification Search ............ 345/4–9, 345/211, 690–697, 419, 424, 426; 348/42–60
See application file for complete search history.

(56) References Cited

U.S. PATENT DOCUMENTS 4,670,744 A * 6/1987 Buzak ............... 345/6

(Continued)

FOREIGN PATENT DOCUMENTS

EP    0 928 117 A2    7/1999

(Continued)

OTHER PUBLICATIONS

Suyama et al., "Depth-Fused 3-D Display Using A New 3-D Perceptual Phenomenon", The Journal of Imaging Society of Japan, vol. 41, No. 4, pp. 374-378, 2002.

(Continued)

*Primary Examiner*—Alexander Eisen
*Assistant Examiner*—Jason M Mandeville
(74) *Attorney, Agent, or Firm*—Oblon, Spivak, McClelland, Maier & Neustadt, L.L.P.

(57) ABSTRACT

In a technology for displaying two-dimensional images on a plurality of display planes placed at different depth positions as seen from an observer to display a three-dimensional stereoscopic image, when a display object having brightness darker than that of a background is displayed, the disclosed method including: generating first two-dimensional images that are obtained by projecting the background plane onto the plurality of display planes along a line of sight of the observer, and displaying the first two-dimensional images on the display planes respectively wherein brightness of each of the first two-dimensional images is changed independently for each display plane; and generating second two-dimensional images that are obtained by projecting the display object onto the plurality of display planes along the line of sight of the observer, and displaying the second two-dimensional images on the display planes respectively in which brightness of each of the two-dimensional images is set to be the same among the display planes. In addition, when using transmissive display plane, when a display object having brightness brighter than that of a background is displayed, transparency of the first two-dimensional images are changed independently for each display plane, and transparency of each of the two-dimensional images is set to be the same among the display planes.

14 Claims, 22 Drawing Sheets

U.S. PATENT DOCUMENTS

| | | | |
|---|---|---|---|
| 5,181,745 A | 1/1993 | Jacobsen et al. | |
| 6,377,229 B1* | 4/2002 | Sullivan | 345/6 |
| 6,525,699 B1* | 2/2003 | Suyama et al. | 345/6 |
| 6,559,813 B1* | 5/2003 | DeLuca et al. | 345/8 |
| 6,940,473 B2* | 9/2005 | Suyama et al. | 345/6 |
| 7,002,532 B2* | 2/2006 | Suyama et al. | 345/6 |
| 2002/0105516 A1* | 8/2002 | Tracy | 345/419 |
| 2002/0130820 A1* | 9/2002 | Sullivan | 345/6 |
| 2002/0163482 A1* | 11/2002 | Sullivan | 345/6 |
| 2003/0067422 A1* | 4/2003 | Suyama et al. | 345/6 |
| 2003/0067423 A1* | 4/2003 | Suyama et al. | 345/6 |
| 2003/0071765 A1* | 4/2003 | Suyama et al. | 345/6 |
| 2003/0080923 A1* | 5/2003 | Suyama et al. | 345/6 |
| 2005/0206582 A1* | 9/2005 | Bell et al. | 345/6 |

FOREIGN PATENT DOCUMENTS

| | | |
|---|---|---|
| GB | 702051 A | 1/1954 |
| JP | 10-143681 | 5/1998 |
| JP | 3022558 | 1/2000 |
| JP | 2000-214413 | 8/2000 |
| JP | 2001-54144 | 2/2001 |
| JP | 3460671 | 8/2003 |
| JP | 2004 200784 | 7/2004 |
| JP | 2004 201004 | 7/2004 |
| JP | 2005-189426 | 7/2005 |
| WO | WO 91/15930 A2 | 10/1991 |

OTHER PUBLICATIONS

Date et al., "Luminance Additivity in Compact Depth-Fused-3D Display Using A Stack Of Two TN-LCDS", Proceedings of the 10th International Display Workshops, 10th Edition, pp. 1409-1412, 2003.

Uehira et al., "Compression of Depth-Fused 3-D Images Using Depth Map Data", Journal of Electronic Imaging, vol. 14, No. 2, pp. 023020-1 to 023020-7, 2005.

* cited by examiner

—Related Art—

--Related Art--

FIG.11
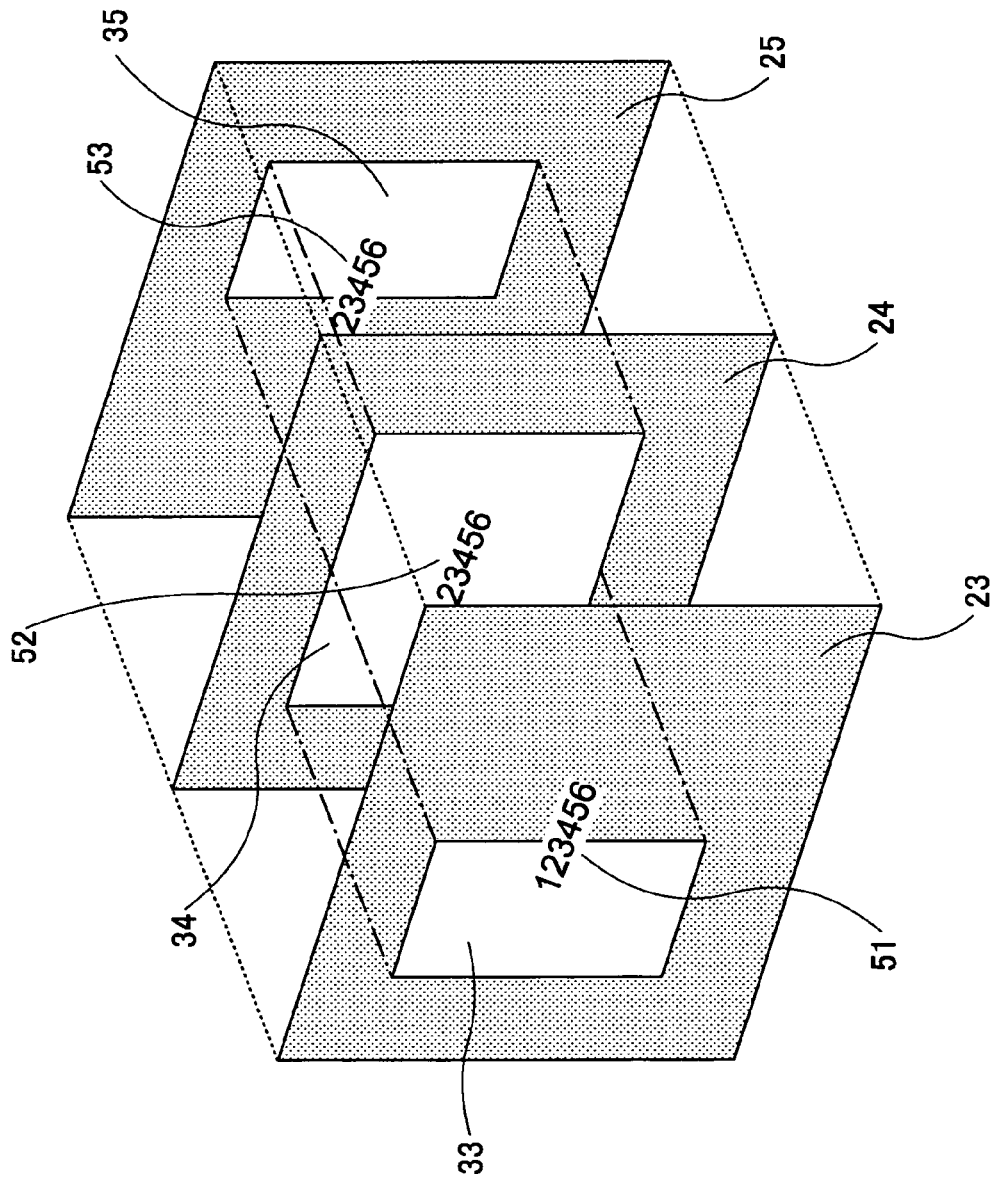
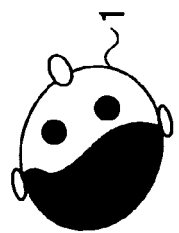

3D DISPLAYING METHOD, DEVICE AND PROGRAM

TECHNICAL FIELD

The present invention relates to a three-dimensional display method and the apparatus. More particularly, the present invention relates to a display method for displaying figure or character information to be displayed with a relatively dark hue such as black in a three dimensional display method for displaying a three-dimensional stereoscopic image by overlapping a plurality of two-dimensional images while distributing brightness, and relates to a display method for displaying figure or character information to be displayed with a relatively bright hue such as white in a three-dimensional display method for displaying a three-dimensional stereoscopic image by overlapping a plurality of two-dimensional images while distributing transparency.

BACKGROUND ART

From the past, some methods have been proposed for displaying a stereoscopic image on a display screen of a PC (Personal Computer) and the like. In the methods, a method has been proposed for displaying a three-dimensional stereoscopic image of a display object by overlapping a plurality of two-dimensional images (refer to following patent documents 1 and 2).

The display method described in the patent documents 1 and 2 is called a DFD (Depth-Fuse 3D) display scheme. In the three-dimensional display method of the DFD display scheme, an image having a three-dimensional appearance in the depth direction can be displayed by changing brightness of a display object on each plane of the plurality of two-dimensional images to be overlapped (in the case of brightness distribution type DFD display), or by changing transparency (in the case of transparency distribution type DFD display).

According to the display method of the DFD display scheme, since resolution of the display object is the same as the resolution of a normal two-dimensional image, the scheme has a characteristic that even a small display object such as a small character can be clearly displayed with high resolution.

There are following documents as prior art documents relating to the present invention.
[Patent document 1] Japanese Patent No. 3022558
[Patent document 2] Japanese Patent No. 3460671

DISCLOSURE OF THE INVENTION

Problem to be Solved by the Invention

However, in the display method of the brightness distribution type DFD display scheme, brightness of the two-dimensional images to be overlapped is distributed according to display positions of the display object in the depth direction, and when displaying the object on a screen of a personal computer, brightness displayed on the screen is controlled by digital information such as pixel values having 256 levels of gray, for example. Thus, as to the color of black that is displayed with a pixel value of 0 that corresponds to the minimum brightness on the screen, pixel values cannot be distributed into the plurality of screens. As a result, brightness of the display object cannot be distributed, and the black display object cannot be displayed stereoscopically in the depth direction.

In addition, even when the object is not black that is represented on the personal computer with the pixel value 0, if the object has a low pixel value so as to be displayed with a dark brightness hue, the number of combinations for distributing the brightness into the plurality of screens is limited so that display accuracy in the depth position becomes rough.

On the other hand, as to the display method of the transparency distribution type DFD display scheme, transparency is distributed into the two-dimensional images to be overlapped. Thus, as to the color of white that is represented with the maximum pixel value corresponding to the highest brightness on the screen, transparency cannot be distributed to the object represented on plural screens, so that it is impossible to display the white object stereoscopically in the depth direction.

In addition, even when the object is not white that is represented on the personal computer with the maximum pixel value, if the object has a high pixel value so as to be displayed with a bright hue, the number of combinations for distributing the transparency into the plurality of screens is limited so that display accuracy in the depth position becomes rough.

On the other hand, it is very common that character information such as a menu of a word processor, OS and the like is displayed with a dark tone such as black and with a relatively small size against a bright background such as white on the screen of the personal computer, or alternatively the character information is displayed with a bright tone such as white and with a relatively small size against a dark background such as black. Although the display method of the DFD display scheme is applicable for display of such characters in terms of resolution, the brightness distribution type DFD display cannot display the character by changing the depth position when the character has a dark hue such as black. In addition, the transparency distribution type DFD display cannot display the character by changing the depth position when the character has a bright hue such as white.

The present invention is contrived for solving the problems of the conventional technology, and an object of the present invention is to provide a technology for enabling to display figure or character information represented with a relatively dark tone such as black against a relatively bright background by changing the depth position when displaying a three-dimensional stereoscopic image by overlapping a plurality of two-dimensional images while distributing brightness. Another object of the present invention is to provide a technology for enabling to display figure or character information represented with a relatively bright tone such as white against a relatively dark background by changing the depth position when displaying a three-dimensional stereoscopic image by overlapping a plurality of two-dimensional images while distributing transparency.

Means for Solving the Problem

In the present invention disclosed in the specification, outline of a representative one is simply described as follows.

For solving the above-mentioned problem, in the present invention, in a case when displaying a three-dimensional stereoscopic image by overlapping a plurality of two-dimensional images while distributing brightness, for displaying a figure or character of a relatively dark color such as black at an arbitrary depth position, the brightness of the figure or character of the relatively dark color is not changed. But, two-dimensional images of the background are displayed on a plurality of display planes respectively so as to change the depth position of the background plane of the figure or the character, and the part of the figure or character of the relatively dark color is displayed with the same brightness for each display plane such that overlapped brightness seen from the observer becomes the same as the original brightness.

In addition, when the brightness of the figure or character part of the dark color is 0, the part is displayed with brightness 0 on each display plane. And, when the figure or character part of the dark color is displayed with pixel value 0 on a display screen on which display brightness is controlled by pixel values having a level of gray of a number of bits determined by a digital signal in a personal computer, the part is displayed with pixel value 0 on each display plane.

Accordingly, by overlapping the backgrounds of the character with each other on the plurality of display planes by changing brightness, the backgrounds are perceived as a plane existing at an arbitrary depth position.

In addition, by displaying character information having a color darker than that of the background on a plurality of display planes with the same brightness in a range of the plane displayed as the background, the character information is perceived as if it is displayed on the background that is perceived at the arbitrary depth position for the observer.

In addition, in the present invention, in a case when displaying a three-dimensional stereoscopic image by overlapping a plurality of two-dimensional images while distributing transparency, for displaying a figure or character of a relatively bright color such as white at an arbitrary depth position, the transparency of the figure or character of the relatively bright color is not changed. But, two-dimensional images of the background are displayed on a plurality of display planes respectively so as to change the depth position of the background plane of the figure or the character, and the part of the figure or character of the relatively dark color is displayed with the same transparency for each display plane such that overlapped brightness seen from the observer becomes the same as the original brightness.

In addition, when the transparency of the figure or character part of the bright color is the maximum, the part is displayed with the maximum transparency on each display plane.

Accordingly, by overlapping the backgrounds of the character with each other on the plurality of display planes by changing transparency, the backgrounds are perceived as a plane existing at an arbitrary depth position.

In addition, by displaying character information having a color brighter than that of the background on a plurality of display planes with the same transparency in a range of the plane displayed as the background, the character information is perceived as if it is displayed on the background that is perceived at the arbitrary depth position for the observer.

Effect of the Invention

An effect obtained by representative one of the invention disclosed in the specification is briefly described as follows.

According to the present invention, when displaying a three-dimensional stereoscopic image by overlapping a plurality of two-dimensional images while distributing brightness, a relatively small-sized display object that is displayed with brightness lower than that of the background can be displayed at an arbitrary depth position.

In addition, when displaying a three-dimensional stereoscopic image by overlapping a plurality of two-dimensional images while distributing transparency, a relatively small-sized display object that is displayed with brightness higher than that of the background can be displayed at an arbitrary depth position.

In addition, by applying the present invention to an application for inputting/editing character information, application software that can be easily used can be provided in which an input/edit position of the character, a position of the search result or a position of the selected character can be easily perceived by the user.

BRIEF DESCRIPTION OF THE DRAWINGS

FIG. 11 is a block diagram showing a schematic configuration of a three-dimensional display apparatus of an embodiment 2 of the present invention;

Figure 1:
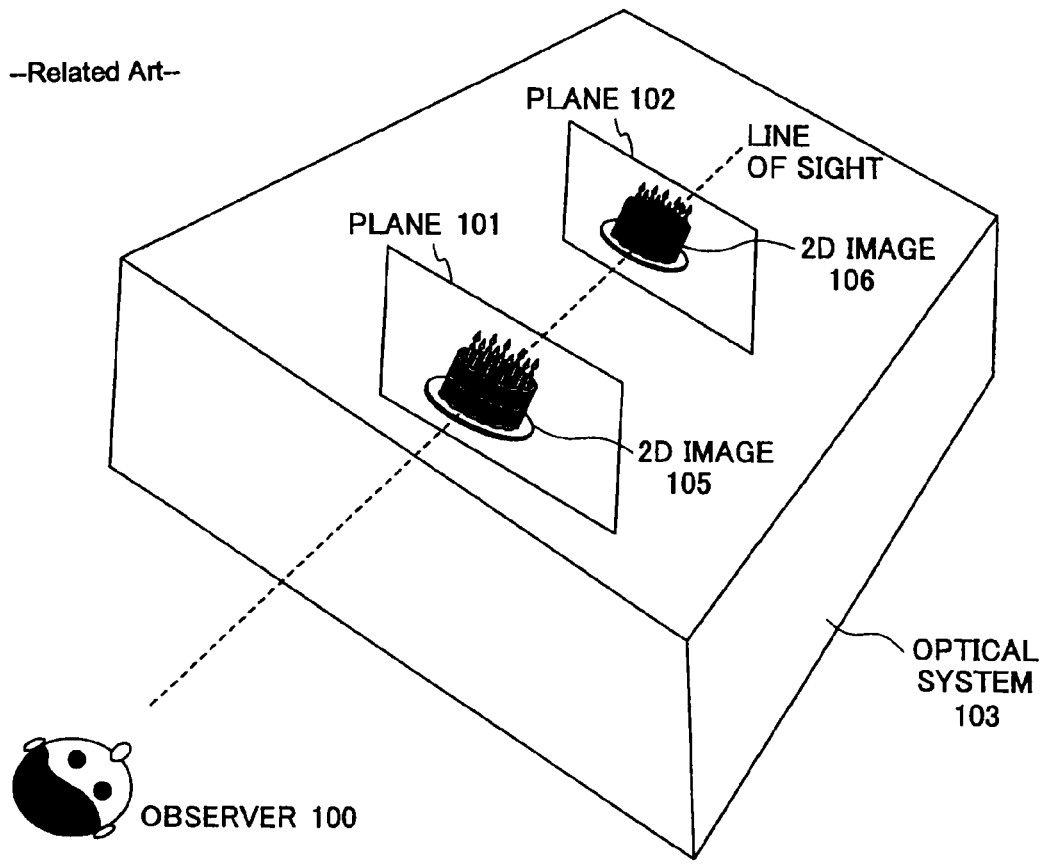
FIG. 1 is a figure for explaining an example of a DFD type three-dimensional display apparatus.

DESCRIPTION OF REFERENCE SIGNS 1, 100 observer
21, 22, 23, 24, 25, 26, 27 display plane
31, 32, 33, 34, 35, 36, 37 plane for background
41, 42 FIG.
51, 52, 53, 54, 55, 211 character information
61, 71 two-dimensional image output apparatus
62, 63 two-dimensional display apparatus
64 cable
111, 112 transmissive display apparatus
101, 102 display plane
203 optical system
204 three-dimensional object
205, 206, 207, 108 2D image
110 light source
201, 202 character input screen of character input/edit software
203 background of searched character string part
204 background of searched character string part
205 plane for background of menu
206 plane for background of sub-menu
207 plane for background of selected menu
301 step between two background plans of character
401 cursor
501 button
511 menu of application
512 sub-menu
601 pointer
611, 711 two-dimensional image calculation part
612, 712 brightness determination part
613, 713 brightness value calculation part

PREFERRED EMBODIMENTS FOR CARRYING OUT THE INVENTION

In the following, embodiments of the present invention are described with reference to figures.

In all figures for explaining the embodiments, the same reference numerals are assigned to the same functions, and description for the same function is not given repeatedly. First, the DFD type three-dimensional display apparatus is described.

Example of DFD Type Three-Dimensional Display Apparatus

FIG. 1 is a figure for explaining an example of the DFD type three-dimensional display apparatus.

In the three-dimensional display apparatus shown in FIG. 1, a plurality of display planes (101, 102) are set in front of the observer 100 (the display plane 101 is closer to the observer 100 than the display plane 102), so that the three-dimensional display apparatus forms an optical system 103 including two-dimensional display apparatuses and various optical elements for displaying a plurality of two-dimensional images on the display planes (101, 102).

The two-dimensional display apparatus that can be used may be a CRT, a liquid crystal display, a LED display, a plasma display, an EL display, a FED display, a DMD, a projection type display, a line drawing type display such as a oscilloscope, etc., and the optical element that can be used may be a lens, a total reflection mirror, a partial reflection mirror, a curved mirror, a prism, a polarization element, a wave plate, etc.

By the way, FIG. 1 shows a configuration the same as one disclosed in the patent document 1, and please refer to the patent document 1 for details of the setting method of the display planes.

Figure 2:
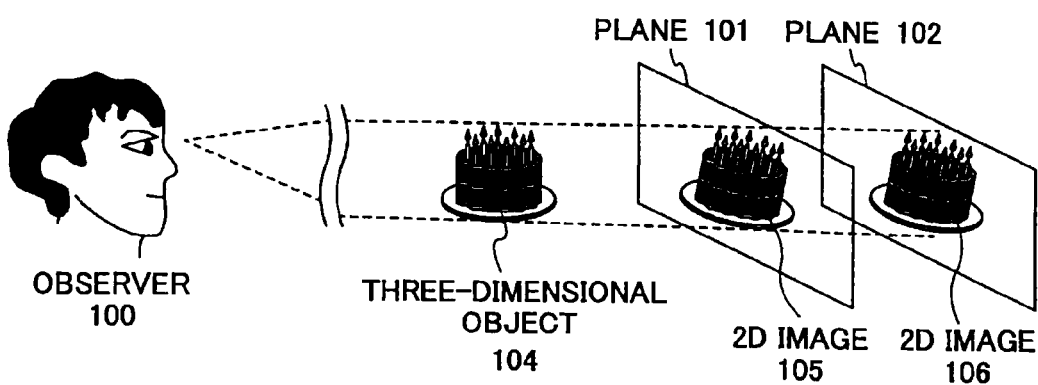
FIG. 2 is a figure for explaining a method for generating 2D images displayed on display planes of the DFD type three-dimensional display apparatus shown in FIG. 1.

As shown in FIG. 2, the three-dimensional display apparatus shown in FIG. 1 generates images (to be referred to as "2D images") (105, 106) obtained by projecting a three-dimensional object 104 to be presented to the observer 100 onto the display planes (101, 102) along the line of sight of both eyes of the observer 100.

As methods for generating the 2D images, there are a method for using two-dimensional images of the three-dimensional object 104 taken by a camera from the line of sight direction, a method for synthesizing plural two-dimensional images taken from different directions, or a method for using a synthesizing technique or modeling by computer graphics.

As shown in FIG. 1, the 2D images (105, 106) are displayed on the display plane 101 and the display plane 102 respectively such that they overlaps with each other as seen from a point on a line connecting between the right eye and the left eye of the observer 100. This is realized by controlling placement of the center position and the center of gravity and enlargement/contraction for each image.

On the apparatus having such configuration, distribution of brightness of the 2D images (105, 106) is changed between them according to the depth position of the three-dimensional object 104 while keeping overall brightness constant as seen from the observer 100 so as to display the three-dimensional stereoscopic image of the three-dimensional object 104. Thus, the three-dimensional display apparatus of this scheme is called a brightness distribution type DFD display apparatus.

An example of the method for changing each brightness of the 2D images (105, 106) is described. By the way, since black and white figures are used, a part having higher brightness is drawn to be darker in figures described in the following for the sake of easy understanding.

Figure 3:
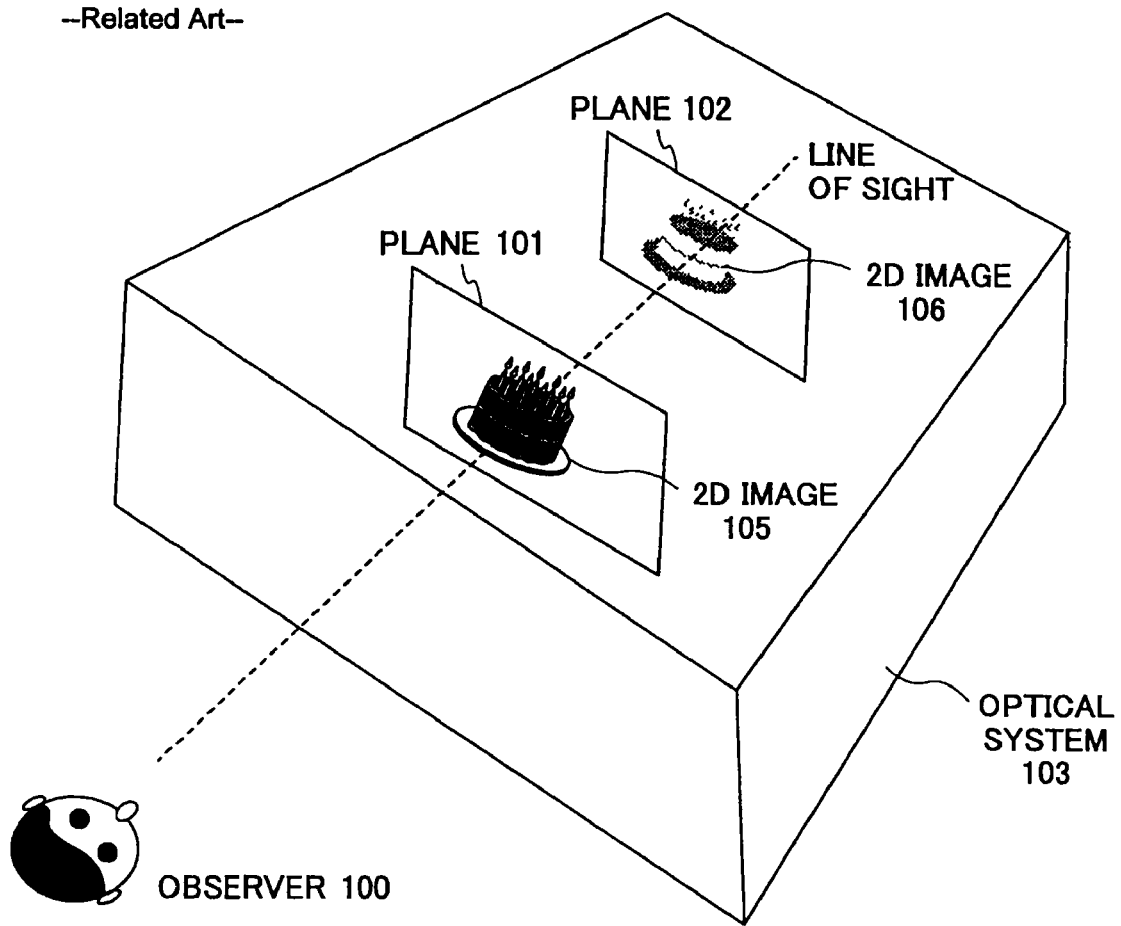
FIG. 3 is a figure for explaining principle of display of the DFD type three-dimensional display apparatus shown in FIG. 1.

For example, as shown in FIG. 3, when the three-dimensional object 104 is on the display plane 101, the brightness of the 2D image 105 on the plane is set to be equal to the brightness of the three-dimensional object 104, and the brightness of the 2D image 106 on the display plane 102 is set to be 0.

Figure 4:
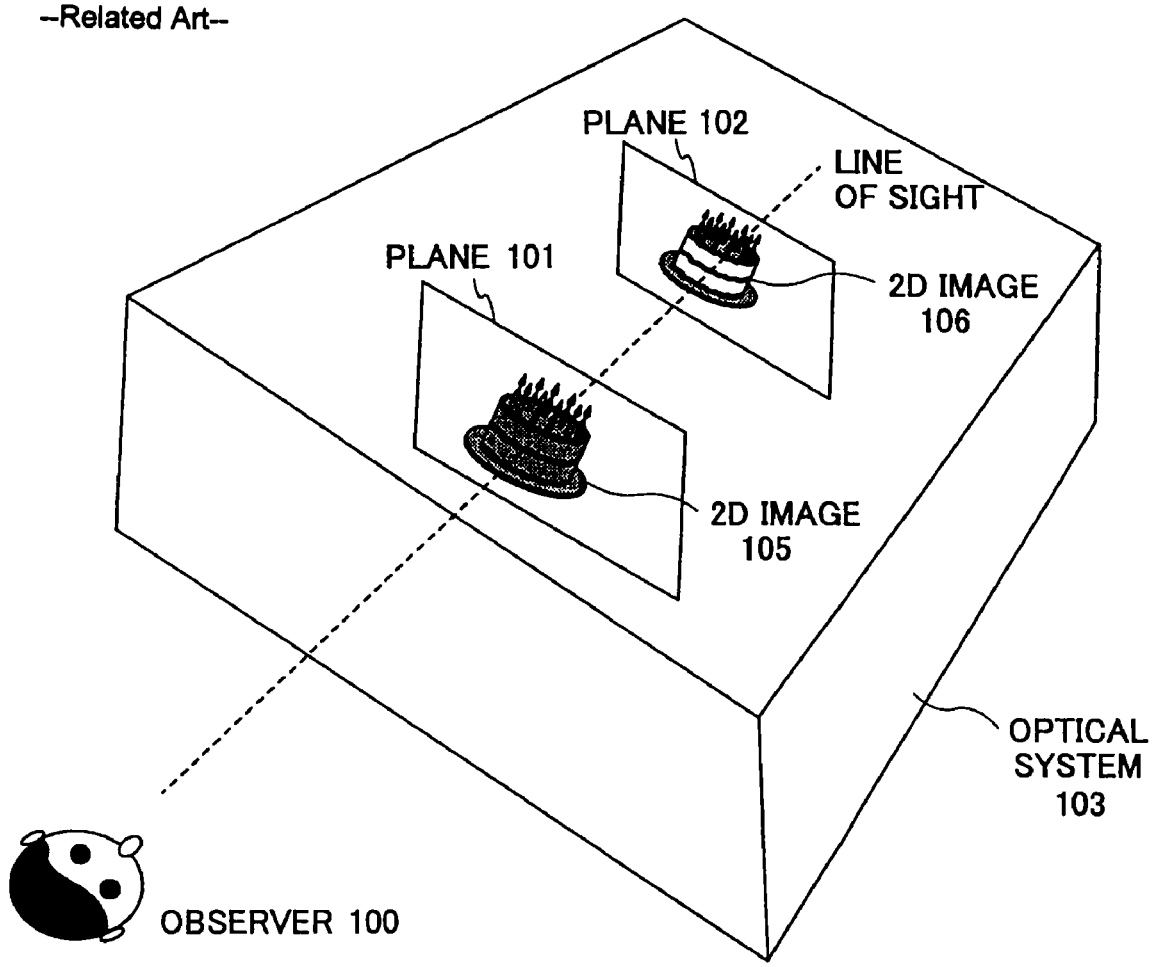
FIG. 4 is a figure for explaining principle of display of the DFD type three-dimensional display apparatus shown in FIG. 1.

Next, for example, when the three-dimensional object 104 is a little far from the observer 100 so as to be placed at a position closer to the display plane 102 side than the display plane 101, the brightness of the 2D image 105 is slightly reduced and the brightness of the 2D image 106 is slightly increased as shown in FIG. 4.

Figure 5:
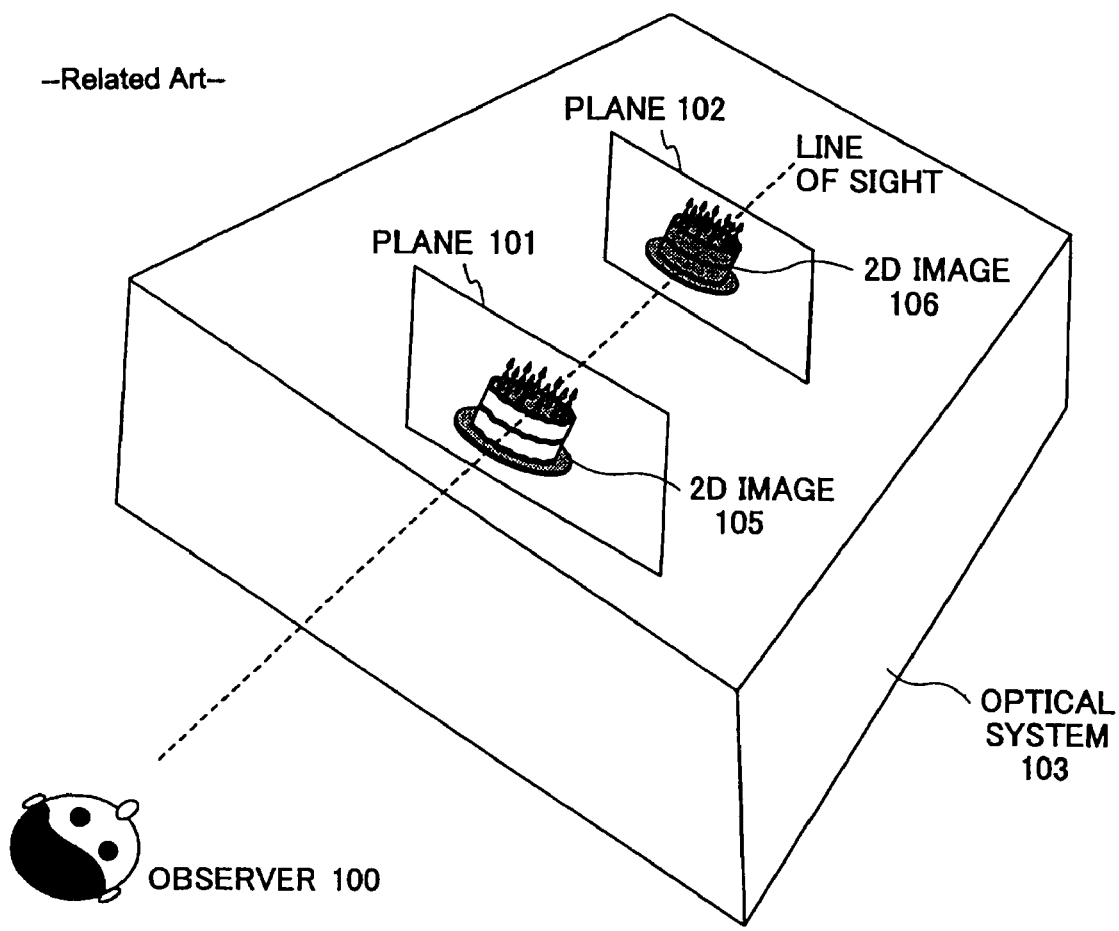
FIG. 5 is a figure for explaining principle of display of the DFD type three-dimensional display apparatus shown in FIG. 1.

Next, for example, when the three-dimensional object 104 is further from the observer 100 so as to be placed at a position more closer to the display plane 102 side than the display plane 101, the brightness of the 2D image 105 is further reduced and the brightness of the 2D image 106 is further increased as shown in FIG. 5.

Figure 6:
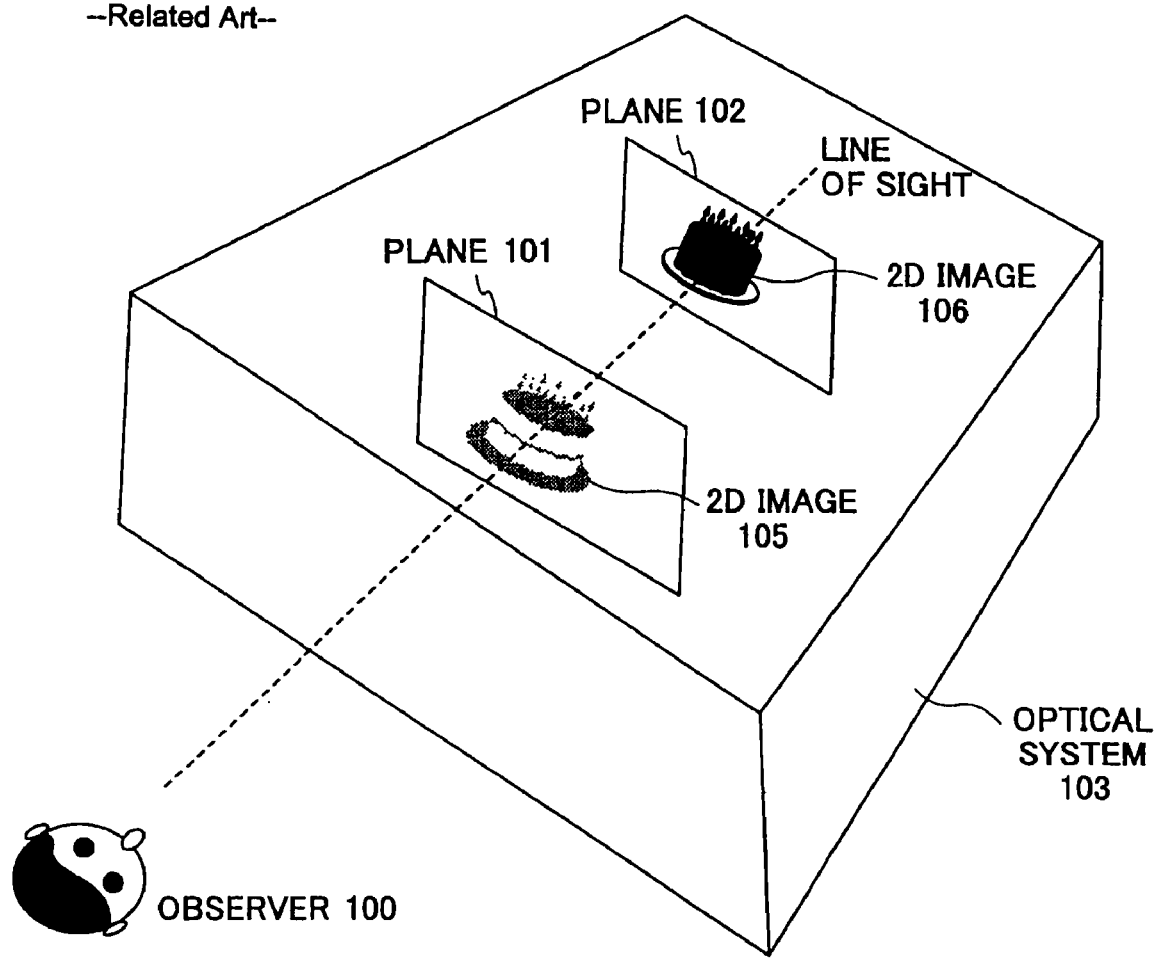
FIG. 6 is a figure for explaining principle of display of the DFD type three-dimensional display apparatus shown in FIG. 1.

In addition, for example, as shown in FIG. 6, when the three-dimensional object 104 is on the display plane 102, the brightness of the 2D image 106 on the plane is set to be equal to the brightness of the three-dimensional object 104, and the brightness of the 2D image 105 on the display plane 101 is set to be 0.

By displaying the object in the above-mentioned way, although 2D images (105, 106) are displayed, the observer 100 perceives as if the three-dimensional object 104 is located in the middle of the display planes (101, 102) due to physiologic or psychological factors or false sense of the observer (human) 100.

For example, when 2D images (105, 106) having almost the same brightness are displayed on the display planes (101, 102) respectively, the three-dimensional object 104 is perceived to be located near the middle between the depth positions of the display planes (101, 102). In this case, the three-dimensional object 104 is sensed to have solidity for the observer 100.

Although a method is mainly described in which the depth position of the whole of the three-dimensional object is represented using the two-dimensional images displayed on the display planes (101, 102) in the above description, it is apparent that the three-dimensional display apparatus shown in FIG. 1 can be used as an apparatus for representing depths of the three-dimensional object itself.

For representing the depths of the three-dimensional object itself, on the apparatus having the configuration shown in FIG. 1, distribution of brightness of each part of the 2D images (105, 106) is changed according to the depth position of each part of three-dimensional object 104 while keeping overall brightness as seen from the observer 100 to be constant.

By the way, in the above-description, descriptions are given mainly on two planes of planes on which the two-dimensional images are placed, and on a case where the object to be presented to the observer is located between the two-planes. But, it is apparent that the three-dimensional stereoscopic image can be displayed in the same way even when the number of the planes on which the two-dimensional images are placed is greater than two, or even when the position of the object to be presented is different.

For example, when the number of the planes is three and when a first three-dimensional object exists between a plane close to the observer 100 and a middle plane, and when a second three-dimensional object exists between the middle plane and a plane far from the observer 100, 2D images of the first three-dimensional object are displayed on the plane close to the observer 100 and the middle plane, and 2D images of the second three-dimensional object are displayed on the plane far from the observer 100 and the middle plane, so that three-dimensional stereoscopic images of the first and second three-dimensional objects can be displayed.

In addition, the 2D images can be moved three-dimensionally. Movement from right to left or up and down with respect to the observer can be realized using reproduction of a moving picture in each display plane in the same way as a normal two-dimensional display apparatus. As to movement in the depth direction, distribution of brightness of each of the 2D images (105, 106) is changed in synchronization with temporal change in the depth position of the three-dimensional stereoscopic image while keeping the overall brightness as seen from the observer 100 to be constant so that a moving picture of the three-dimensional image can be represented.

As an example, a case is described in which the three-dimensional stereoscopic image gradually moves from the display plane 101 to the display plane 102.

As shown in FIG. 3, when the three-dimensional stereoscopic image is on the display plane 101, the brightness of the 2D image 105 on the display plane 101 is set to be the same as the brightness of the three-dimensional stereoscopic image, and brightness of the 2D image 106 on the display plane 102 is set to be 0.

Next, for example, when the three-dimensional stereoscopic image moves a little away from the observer gradually in terms of time so as to come a little closer to the display plane 102 side, the brightness of the 2D image 105 is reduced gradually in synchronization with the movement of the depth position of the three-dimensional stereoscopic image and the brightness of the 2D image 106 is increased gradually as shown in FIG. 4.

Next, for example, when the three-dimensional stereoscopic image moves further away from the observer 100 in terms of time so as to come to a position more closer to the display plane 102 side than the display plane 101, the brightness of the 2D image 105 is further reduced gradually in synchronization with the movement of the depth position of the three-dimensional stereoscopic image and the brightness of the 2D image 106 is further increased gradually as shown in FIG. 5.

In addition, for example, when the three-dimensional stereoscopic image moves to the display plane 102 gradually in terms of time, the brightness of the 2D image 106 on the plane is changed in terms of time until the brightness becomes the same as the brightness of the three-dimensional stereoscopic image, and the brightness of the 2D image 105 on the display plane 101 is gradually changed until it becomes 0.

By displaying the object in the above-mentioned way, although 2D images (105, 106) are displayed, the observer 100 perceives as if the three-dimensional object stereoscopic image moves in the depth direction from the display plane 101 to the display plane 102 between the display planes (101, 102) due to physiologic or psychological factors or false sense of human.

Although a case is described in which the three-dimensional stereoscopic image moves from the display plane 101 to the display plane 102 in the above description, it is apparent that similar display can be also performed when the image moves from a halfway depth position between the display planes (101, 102) to the display plane 102, when the image moves from the display plane 101 to a halfway depth position between the display planes (101, 102), or when the image moves from a halfway depth position between the display planes (101, 102) to another halfway depth position between the display planes (101, 102).

In the above-description, descriptions are given mainly on two planes of planes on which the two-dimensional images are placed, and on a case where the three-dimensional stereoscopic image to be presented to the observer 100 moves between the two planes. But, even when the number of the planes on which the two-dimensional images are placed is greater than two or when the three-dimensional object to be presented moves across a plurality of planes, it is apparent that the three-dimensional stereoscopic image can be displayed by the similar method so that the same effects can be expected.

In addition, in the above descriptions, a case is described in which one three-dimensional stereoscopic image moves between two planes on which the two-dimensional images are placed. But, when a plurality of three-dimensional objects move, namely, when the two-dimensional image to be displayed includes a plurality of object images each having different moving direction, it is apparent that it is only necessary to change brightness of the object image displayed on each display plane according to the moving direction and moving speed of each object.

Figure 7:
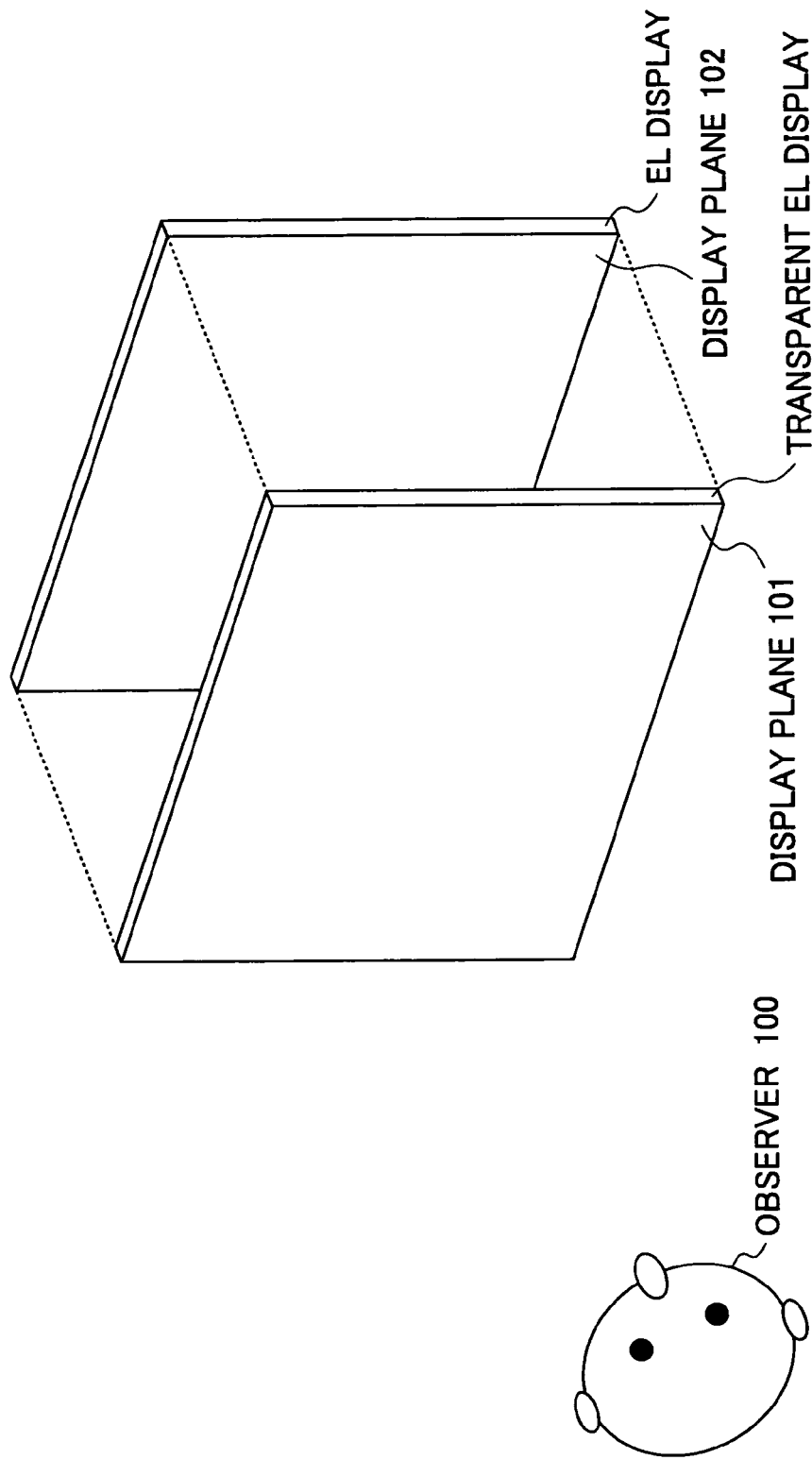
FIG. 7 is a figure for showing an example of a brightness distribution type DFD display apparatus.

FIG. 7 shows an example of a brightness distribution type DFD display apparatus using, as the display planes 101 and 102 in FIG. 1, transparent EL displays formed by combining transparent electrodes and EL light-emitting material. By adopting such configuration, the display apparatus can change brightens on the two-dimensional images of the display planes 101 and 102 independently with each other.

As to the brightness distribution type DFD display apparatus shown in FIG. 7, the observer observes superimposed lights emitted from the two transparent EL displays. Therefore, when the apparatus having this configuration displays a display object of black corresponding to brightness 0 on the screen, the brightness of pixels corresponding to the display object is set to be 0 for both of the two transparent EL displays. At this time, since the observer observes the overlapped two images of brightness 0, the observer cannot sense the depth position of the display object. Therefore, the brightness distribution type DFD display apparatus shown in FIG. 7 cannot display the black display object stereoscopically in the depth direction.

When the display object is not black, but when the display object has a low brightness dark color, since it is necessary to distribute brightness between the two transparent EL displays while overall brightness as seen from the observer is set to be the same as the brightness of the display object, the number of combinations of the brightness distribution is limited so that display accuracy of the depth position becomes rough.

Another Example of the DFD Type Three-Dimensional Display Apparatus

Figure 8:
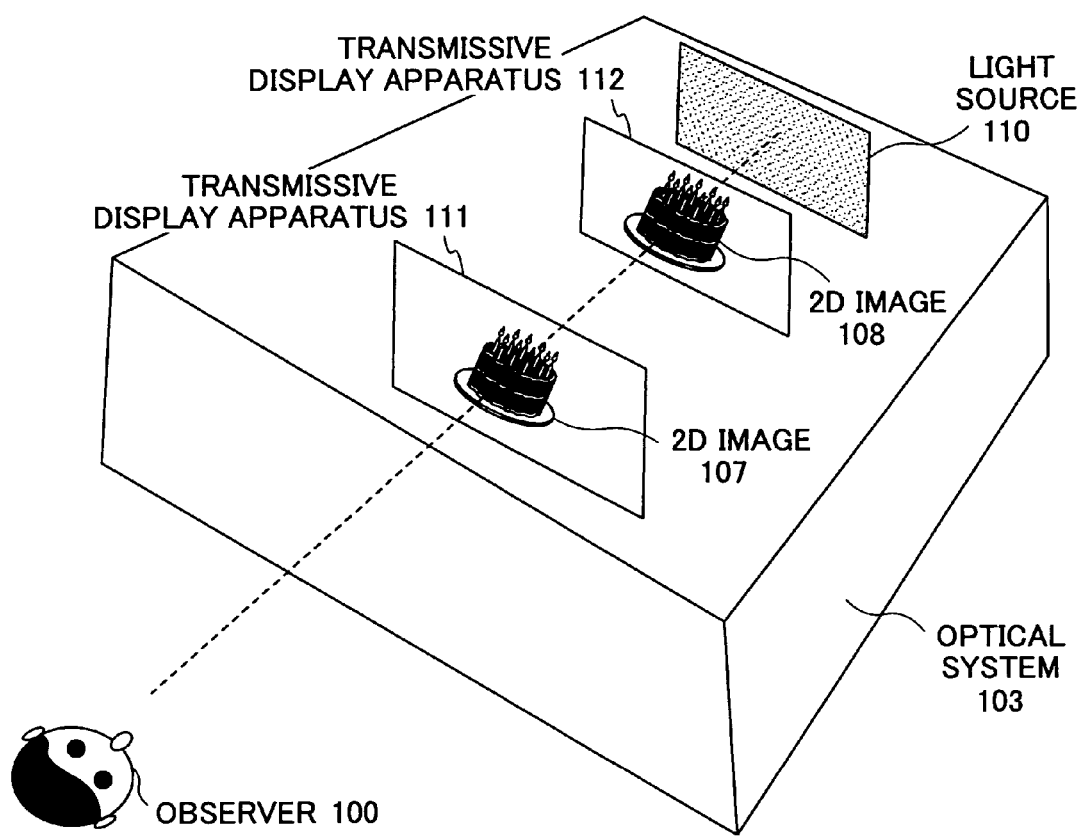
FIG. 8 is a figure for explaining another example of the DFD type three-dimensional display apparatus.

FIG. 8 is a figure for explaining another example of the DFD type three-dimensional display apparatus on which the present invention is based.

The three-dimensional display apparatus shown in FIG. 8 forms an optical system 103 including a plurality of transmissive display apparatuses (111, 112) placed in front of the observer 100 (the transmissive display apparatus 111 is closer to the observer 100 than the transmissive display apparatus 112), various optical elements and a light source 110. That is, in the example shown in FIG. 8, the transmissive display apparatuses (111, 112) are used in place of the display planes (101, 102) shown in FIG. 1.

The transmissive display apparatus (111, 112) may be a twisted nematic liquid crystal display, a in-plane liquid crystal display, a homogeneous liquid crystal display, a ferroelectric liquid crystal display, guest-host liquid crystal display, a polymer dispersed liquid crystal display, a holographic polymer dispersed liquid crystal display, or a combination of these. The optical element that can be used is a lens, a total reflection mirror, a partial reflection mirror, a curved mirror, a prism, a polarization element, a wave plate, etc.

By the way, FIG. 8 shows a case in which the light source 110 is placed at the backmost position as seen from the observer 100, and the configuration shown in FIG. 8 is the same as that described in the patent document 2.

As shown in the before-mentioned FIG. 2, three-dimensional display apparatus shown in FIG. 8 also generates 2D images (107, 108) obtained by projecting the three-dimensional object 104 to be presented to the observer 100 onto the transmissive display apparatuses (111, 112) as seen from the observer 100.

As shown in FIG. 8, the 2D images (107, 108) are displayed on the transmissive display apparatus 111 and the transmissive display apparatus 112 respectively such that they overlaps with each other as seen from a point on a line connecting between the right eye and the left eye of the observer 100.

This is realized by controlling placement of the center position and the center of gravity and enlargement/contraction of each of the 2D images (107, 108) respectively.

In the apparatus having the above configuration, the image seen by the observer 100 is formed by the light that is emitted from the light source 110, passes through the 2D image 108, and further passes through the 2D image 107.

On the three-dimensional apparatus shown in FIG. 8, distribution of transparency of the 2D images (107, 108) is changed according to the depth position of the three-dimensional object 104 while keeping overall brightness as seen from the observer 100 to be constant so as to display the three-dimensional stereoscopic image of the three-dimensional object existing between the transmissive display apparatus 111 and the transmissive display apparatus 112. Thus, the three-dimensional display apparatus of this scheme is called a transparency distribution type DFD display apparatus.

An example of the method for changing each transparency of the 2D images (107, 108) is described.

For example, when the three-dimensional object 104 is on the transmissive display apparatus 111, the transparency on the transmissive display apparatus 111 is set such that the brightness of the 2D image 107 becomes the same as the brightness of the three-dimensional object 104, and the transparency of the part of the 2D image 108 on the transmissive display apparatus 112 is set to be the maximum value of the transmissive display apparatus 112, for example.

Next, for example, when the three-dimensional object 104 is a little far from the observer 100 so as to be placed at a position closer to the transmissive display apparatus 112 side than the transmissive display apparatus 111, the transparency of the part of the 2D image 107 on the transmissive display apparatus 111 is slightly increased and the transparency of the part of the 2D image 108 on the transmissive display apparatus 112 is slightly reduced.

Next, for example, when the three-dimensional object 104 is moved further from the observer 100 so as to be placed at a position more closer to the transmissive display apparatus 112 side than the transmissive display apparatus 111, the transparency of the part of the 2D image 107 on the transmissive display apparatus 111 is further increased and the transparency of the part of the 2D image 108 on the transmissive display apparatus 112 is further reduced.

Further, for example, when the three-dimensional object 104 is on the transmissive display apparatus 112, the transparency on the transmissive display apparatus 112 is set such that the brightness of the 2D image 108 becomes the same as the brightness of the three-dimensional object 104, and the transparency of the part of the 2D image 107 on the transmissive display apparatus 111 is set to be the maximum value of the transmissive display apparatus 111, for example.

By displaying the object in the above-mentioned way, although 2D images (107, 108) are displayed, the observer 100 perceives as if the three-dimensional object 104 is located in the middle of the transmissive display apparatuses (111, 112) due to physiologic or psychological factors or false sense of the observer (human) 100.

That is, for example, when 2D images (107, 10) having almost the same brightness are displayed on the transmissive display apparatuses (111, 112) respectively, the three-dimensional object 104 is felt to be located near the middle of the depth positions of the transmissive display apparatuses (111, 112). In this case, the three-dimensional object 104 is sensed to have solidity for the observer 100.

In the above description, although a method is mainly described in which the depth position of the whole of the three-dimensional object is represented using two-dimensional images displayed on the transmissive display apparatus (111, 112), it is apparent that the transparency distribution type DFD display apparatus also can be used for representing depths of the three-dimensional object itself using the same method described for the three-dimensional display apparatus shown in FIG. 1.

In addition, also in the transparency distribution type DFD display apparatus shown in FIG. 8, the 2D images can be moved three-dimensionally by the same method as one described in the brightness distribution type DFD display apparatus. Movement from right to left or up and down with respect to the observer can be realized using reproduction of a moving picture in each transmissive display apparatus in the same way as a normal two-dimensional display apparatus. As to movement in the depth direction, the moving picture of the three-dimensional stereoscopic image can be represented by changing transparency in a plurality of transmissive display apparatuses in terms of time.

As mentioned above, the brightness distribution type DFD display apparatus shown in FIG. 1 and the transparency distribution type DFD display apparatus shown in FIG. 8 are different in the following point. In the brightness distribution type DFD display apparatus shown in FIG. 1, the brightness of the 2D image displayed on a plane closer to the three-dimensional object 104 is set greater than the brightness of the 2D image displayed on another plane far from the three-dimensional object 104. On the other hand, the transparency distribution type DFD display apparatus shown in FIG. 8, the transparency of the 2D image displayed on a transmissive display apparatus closer to the three-dimensional object 104 is set smaller than the transparency of the 2D image displayed on another transmissive display apparatus far from the three-dimensional object 104.

Therefore, when the transparency distribution type DFD display apparatus shown in FIG. 8 represents the depths having the three-dimensional object itself or represents the moving picture of the three-dimensional stereoscopic image using the method the same as the method for the brightness distribution type DFD display apparatus, the transparence of the 2D image displayed on each transmissive display apparatus is decreased for a case in which brightness of 2D images displayed on each display plane in the brightness distribution type DFD display apparatus is increased, and the transparence of the 2D image displayed on each transmissive display apparatus is increased for a case in which brightness of 2D images displayed on each display plane in the brightness distribution type DFD display apparatus is decreased.

Figure 9:
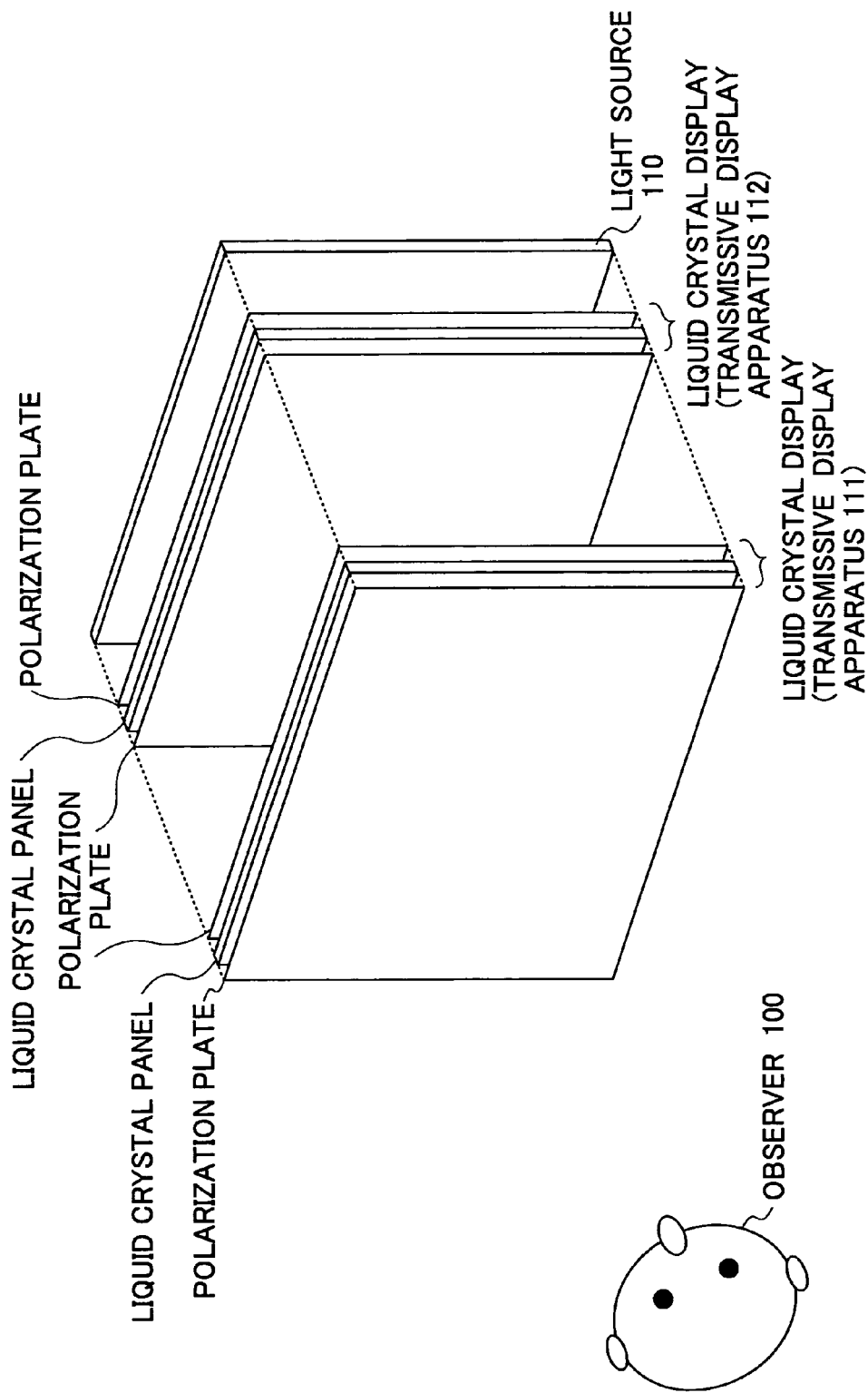
FIG. 9 shows an example of a transparency distribution type DFD display apparatus.

As the transmissive display apparatuses 111, 112 shown in FIG. 8, FIG. 9 shows an example of the transparency distribution type DFD display apparatus using liquid crystal displays each sandwiching an liquid crystal panel between two polarization plates. In this configuration, each liquid crystal display is placed such that the polarization directions of two polarization plates placed between two liquid crystal panels become the same. By the way, any one of the two polarization plates placed between two liquid crystal panels may not be provided. The liquid crystal panel of the liquid crystal display functions as a polarization variable apparatus that can change the polarization direction of light that enters via the polarization plate of the entering side. Therefore, the liquid crystal display can change strength of outgoing light by changing relationship between polarization direction of outgoing light from the liquid crystal panel and polarization direction of the polarization plate in the outgoing side, so that transparency of light can be changed as a whole. Therefore, by using such configuration, transparency of the two-dimensional images on the transmissive display apparatus 111 and 112 can be changed independently with each other.

According to the transparency distribution type DFD display apparatus, the observer observes light emitted from the light source via two liquid crystal displays. Therefore, when the apparatus having this configuration displays a display object of white corresponding to the highest brightness on the screen, transparency of pixels corresponding to the display object is set to be the maximum (almost transparent state) in both of the two liquid crystal display. At this time, since the observer observes overlapped two images that are almost transparent, the observer cannot sense the depth of the display object. Therefore, the transparency distribution type DFD display apparatus shown in FIG. 9 cannot display a white display object stereoscopically in the depth direction.

When the object is not white, but has a bright color having high brightness, since transparency needs to be distributed between the two liquid crystal display while the overall brightness as seen from the observer is set to be the same as the brightens of the display object, the number of combinations of transparency distribution is limited so that display accuracy of the depth position becomes rough.

In the following, embodiments of the present invention are described based on the brightness distribution type DFD display apparatus shown in FIG. 1.

Embodiment 1

Figure 10:
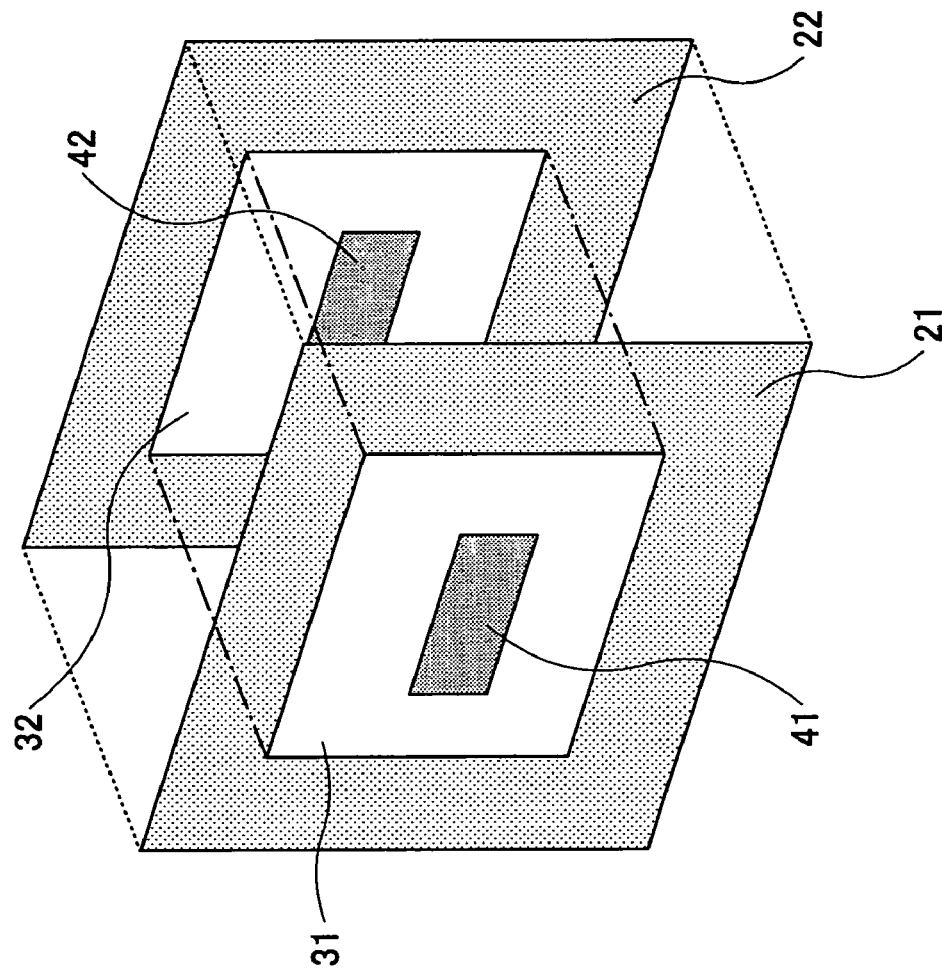
FIG. 10 is a block diagram showing a schematic configuration of a three-dimensional display apparatus of an embodiment 1 of the present invention.

FIG. 10 is a block diagram showing a schematic configuration of a three-dimensional display apparatus of the embodiment 1 of the present invention, and indicates a case in which, on a background of a color of a brightness displayed at an arbitrary depth position, a figure having brightness darker than the background is displayed.

In FIG. 10, 1 indicates an observer, 21 and 22 indicate display planes placed at different depth positions as seen from the observer 1, 31 and 32 indicate background planes, for which brightness is distributed, displayed on the two display planes, 41 and 42 indicate a figure displayed with the same brightness on the background plane 31 and the background plane 32 that are backgrounds of the two-dimensional images on the display planes, wherein the figure has brightness darker than brightness of the background sensed by the observer 1.

Although this embodiment shows a case where the number of the displayed two-dimensional images for which brightness is distributed is two, the object can be achieved in the same way even when the number is more than two.

In this embodiment, the planes 31 and 32 that become a background of the figure are displayed on the two display planes in which brightness of the planes 31 and 33 is changed between the two display planes and are displayed to be overlapped as seen from the observer 1. Therefore, as described for the DFD type three-dimensional display apparatus shown in FIG. 1, the plane that is the background of the figure is perceived as if it is placed at a position between the display plane 21 and the display plane 22 by the observer 1.

On the other hand, the figure (41, 42) that is perceived to be darker than the background planes are displayed on the two display planes (21, 22) with the same brightness. In this case, if the background plane of the figure does not exist, the figure is perceived to exist at a position right in the middle between the two two-dimensional images (21, 22). However, since the background planes exist, the figure is perceived as if it is displayed on the background by the observer 1.

Although a case where the figure (41, 42) has a brightness value is described, when the brightness of the figure is 0, the figure can be perceived, as a black figure, as if it is displayed on the background plane that is seen at an arbitrary depth position by displaying both of the figures (41, 42) with brightness 0.

Embodiment 2

FIG. 11 is a block diagram showing a schematic configuration of the three-dimensional display apparatus of the embodiment 2 of the present invention, and shows a case in which character information is displayed on a background of a color having a brightness displayed at an arbitrary depth position, wherein the figure has brightness darker than that of the background.

In FIG. 11, 1 indicates an observer, 23, 24 and 25 indicate display planes placed at different depth positions as seen from the observer 1, 33, 34 and 35 indicate background planes, for which brightness is distributed, displayed on the three display planes, 51, 52 and 53 indicate character information displayed with the same brightness on the three background plane, wherein the character information has the same brightness that is darker than brightness of the background perceived by the observer 1.

Although this embodiment shows a case where the number of the display planes displaying two-dimensional images for which brightness is distributed is three, the object can be achieved in the same way even when the number of the display planes is two, or more than three.

In this embodiment, the planes (33, 34, 35) that become a background of the character information are displayed on the display planes respectively in which brightness is changed among the display planes and are displayed to be overlapped as seen from the observer 1. Therefore, the background plane 33 and the left side of the background plane 34 is perceived as if it is placed at a position between the display plane 23 and the display plane 24 for the observer 1, and the right side part of the background plane 34 and the background plane 35 is perceived as if it is placed at a position between the display plane 24 and the display plane 25 for the observer 1.

On the other hand, the character information (51, 52, 53) are displayed on the three display planes with the same brightness, so that, because of the existence of the backgrounds, the character information is perceived as if the character information is displayed on each of the backgrounds having different depth positions by the observer 1.

Although a case where the character information has some brightness is described in this embodiment, when the brightness of the character information is 0, by displaying all pieces of the character information (51, 52, 53) in FIG. 11 with brightness 0, the character information can be perceived, as black character information, as if it is displayed on the backgrounds that are perceived to be at arbitrary depth positions for the observer 1.

Embodiment 3

Figure 12:
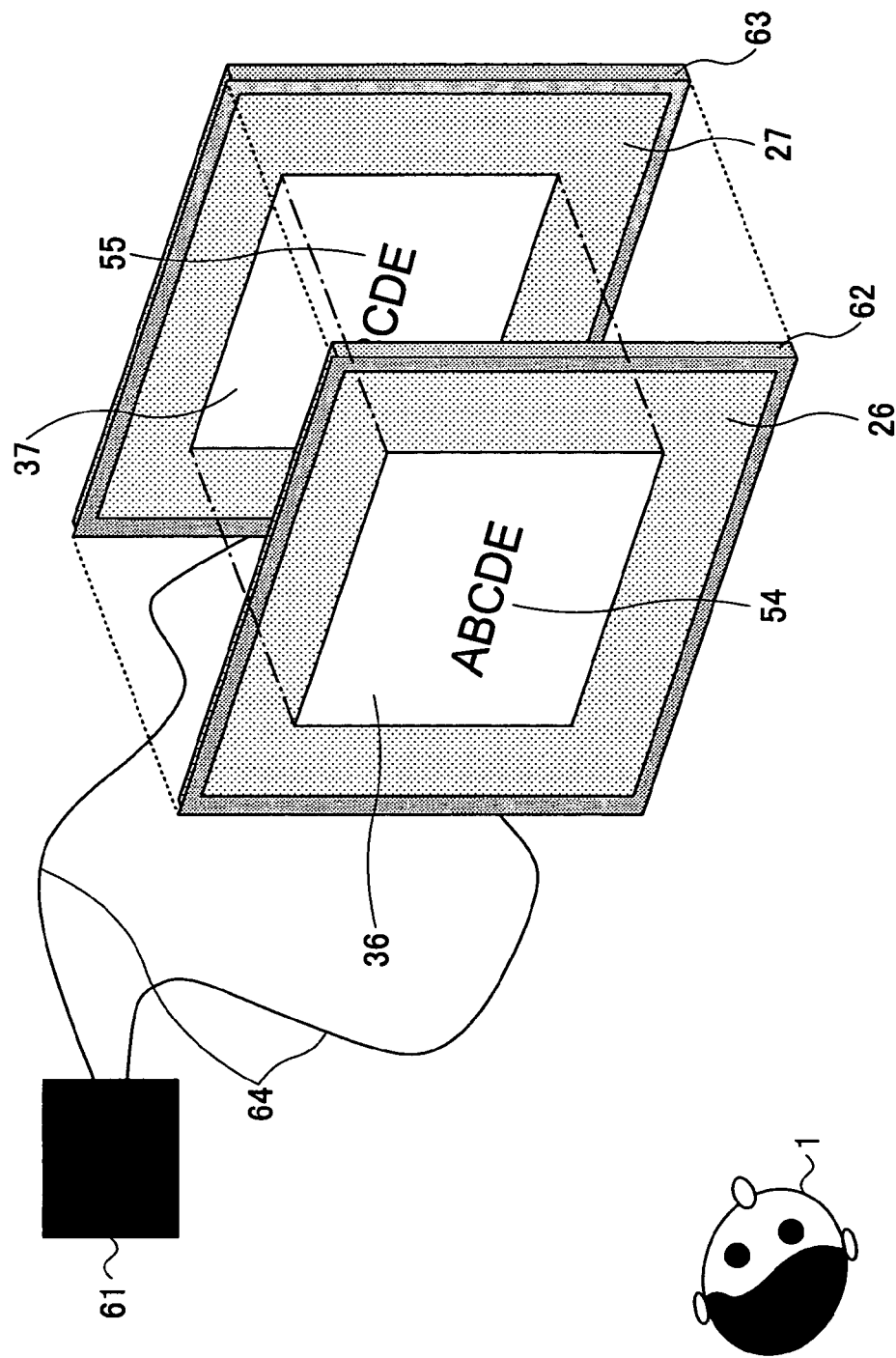
FIG. 12 is a block diagram showing a schematic configuration of a three-dimensional display apparatus of an embodiment 3 of the present invention.

FIG. 12 is a block showing a schematic configuration of the three-dimensional display apparatus of the embodiment 3 of the present invention. As shown in FIG. 12, the embodiment 3 is related to a case in which characters are displayed on a background of a color having a brightness displayed at an arbitrary depth position, wherein the characters have brightness darker than that of the background, and wherein the background and the characters are displayed by an apparatus such as a personal computer for generating two-dimensional images using digital information such as pixels having 256 levels of gray. By the way, the three-dimensional display apparatus in the embodiments 1 and 2 also include the apparatus for generating the two-dimensional images. But, the apparatus is not shown in figures in terms of explaining the principle of the technology of the present invention in the embodiments 1 and 2.

In FIG. 12, 61 indicates a two-dimensional image output apparatus such as a computer for outputting two-dimensional image data as pixel values that are digital information, 62 and 63 are two-dimensional display apparatuses that are placed at different depth positions from the observer 1 for displaying two-dimensional images output from the two-dimensional image output apparatus 1, and 64 is a cable for connecting between the two-dimensional image output apparatus 61 and the two-dimensional display apparatuses (62, 63).

The method and apparatus for performing display by overlapping a plurality of display apparatuses controlled by a computer itself are described in the patent document 2.

In addition, in this embodiment, although a case using the two-dimensional image output apparatus 61 including two image output systems is shown in the figure, it is needless to say that the same display and effect can be obtained also by using two two-dimensional image output apparatuses each having one output system. 26 and 27 indicate display planes on the two two-dimensional display apparatuses (62, 63) placed at different depth positions as seen from the observer 1, 36 and 37 indicate character background two-dimensional images displayed with different pixel values on the two two-dimensional planes (26, 27), 54 and 55 indicate two-dimensional images of character strings displayed with the same pixel values on the background planes (36, 37), wherein the two-dimensional images of the character strings are perceived to be darker than the brightness of the backgrounds (36, 37) perceived by the observer 1 on the two two-dimensional images (26, 27).

Although this embodiment shows a case where the number of the two-dimensional images displayed by distributing brightness by changing pixel values is two, the object can be achieved in the same way even when the number is more than two like the embodiment 1.

Also in this embodiment, the planes (36, 37) that become a character background are displayed on the two display planes (26, 27) respectively with different pixel values between them so that the planes (36, 37) are perceived to have different brightness and the planes (36, 37) are displayed to be overlapped as seen from the observer 1. Therefore, the background plane (36, 37) is perceived as if it is placed at a position between the display plane 26 and the display plane 27 for the observer 1 as described in the description of the brightness distribution type DFD display apparatus shown in FIG. 1.

On the other hand, the character information (54, 55) perceived to be darker than the planes are displayed on the two display planes (26, 27) with the same brightness, so that the character information is perceived as if the character information is displayed on the background for the observer 1.

In this embodiment, when the pixel value of the character information (54, 55) is 0, by displaying the character information on each display apparatus with the pixel value of 0, the same effect can be obtained.

Figure 13:
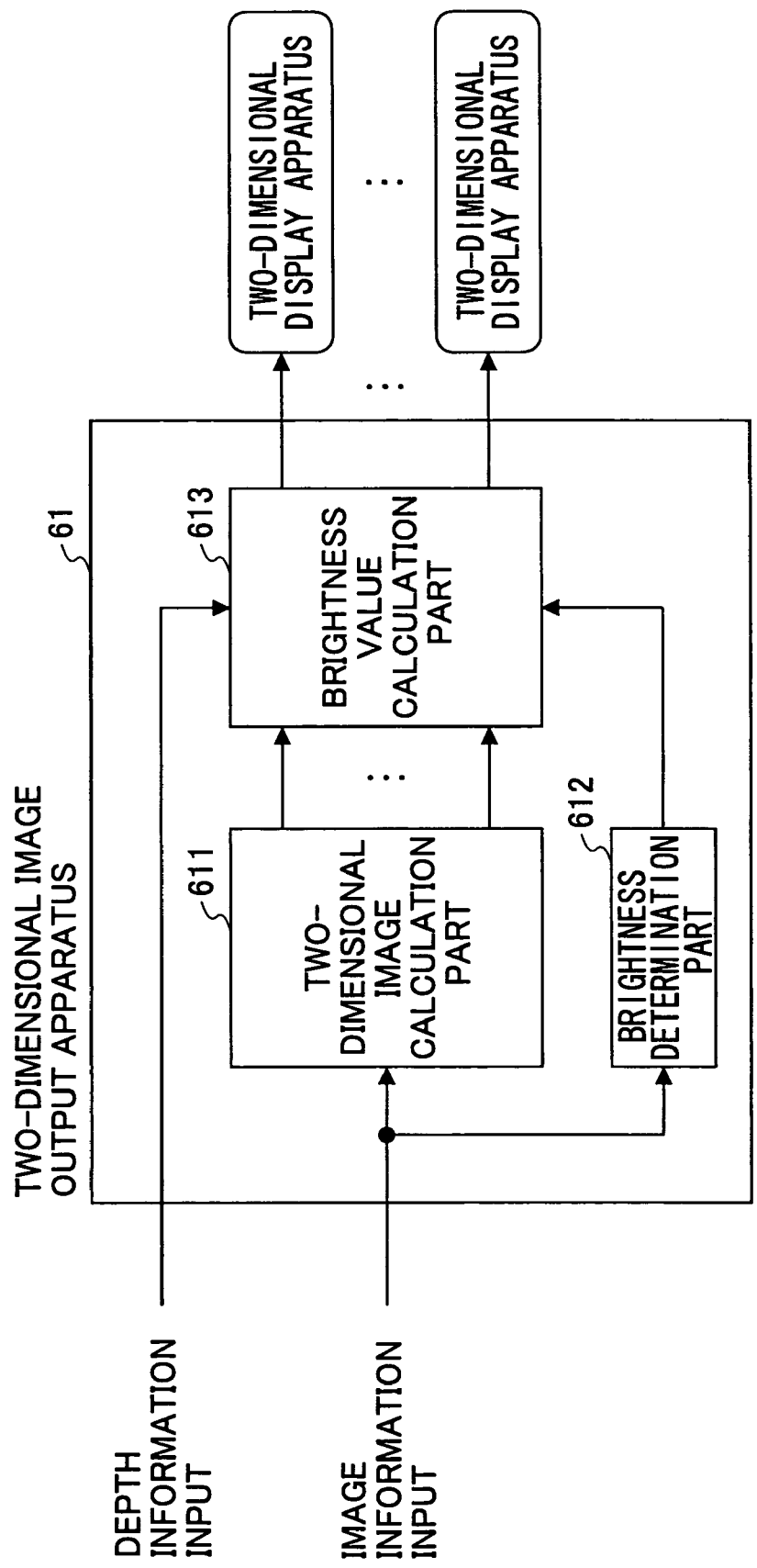
FIG. 13 is a figure for showing a functional configuration example of the two-dimensional image output apparatus 61.

FIG. 13 shows a functional configuration example of the two-dimensional image output apparatus 61. As shown in FIG. 13, the two-dimensional image output apparatus 61 includes a two-dimensional image calculation part 611 for calculating each two-dimensional image to be displayed on the two-dimensional display apparatuses based on input image information, a brightness determination part 612 for performing threshold determination for the brightness value based on the input image information, and a brightness value calculation part 613 for performing processes for calculating the brightness value of each two-dimensional image to be displayed on the two-dimensional display apparatus based on depth information. In addition, the two-dimensional display apparatuses that form each display plane are connected.

The two-dimensional image output apparatus 61 can be realized using a general computer including a CPU, a storage and the like. Each of the above-mentioned function parts is realized by executing a program of the present invention on the computer.

Next, operation of the two-dimensional image output apparatus 61 is described with reference to a flowchart of FIG. 14.

In the operation, it is assumed that the range of the background for the display object is specified beforehand and image information including the specified range is input into the two-dimensional image output apparatus 61. In addition, a predetermined threshold to be compared with the brightness value of the display object is prepared, and is stored in the storage beforehand. In this embodiment, the display object is a character.

First, when the brightness values and the depth values of the display object and the background are input into the two-dimensional image apparatus 61 as the image information and the depth information (step 1), the two-dimensional image calculation part 611 calculates two-dimensional images of the display object and the background for each display plane (step 2).

In addition, the brightness determination part 612 determines whether the brightness value of the display object is equal to or less than the predetermined threshold (step 3). When the brightness value of the display object is equal to or less than the predetermined threshold, the brightness determination part 612 determines whether the brightness value of the display object is less than the brightness value of the background (step 4). When the brightness value of the display object is less than the brightness value of the background, the brightness value calculation part 613 calculates brightness values of each two-dimensional image of the background according to the depth value of the display object (step 5A). Then, the brightness value calculation part 613 sets brightness values of each two-dimensional image of the display object to be the same value (step 6A). When setting the brightness values of each two-dimensional image of the display object to be the same value, the brightness is set such that overall brightness perceived when the displayed two-dimensional images are overlapped becomes the same as the brightness of the display object. Then, each of the calculated two-dimensional images are output to a corresponding two-dimensional display apparatus (step 7).

When the brightness value of the display object is greater than the threshold in step 3, or when the brightness value of the display object is equal to or greater than the brightness value of the background, the brightness value calculation part 613 calculates the brightness values of each two-dimensional image of the background according to the depth value of the background (step 5B), and calculates the brightness value of the each two-dimensional image of the display object according to the depth value of the display object (step 6B). Then, each of the calculated two-dimensional images is output to a corresponding two-dimensional display apparatus (step 7).

Figure 14:
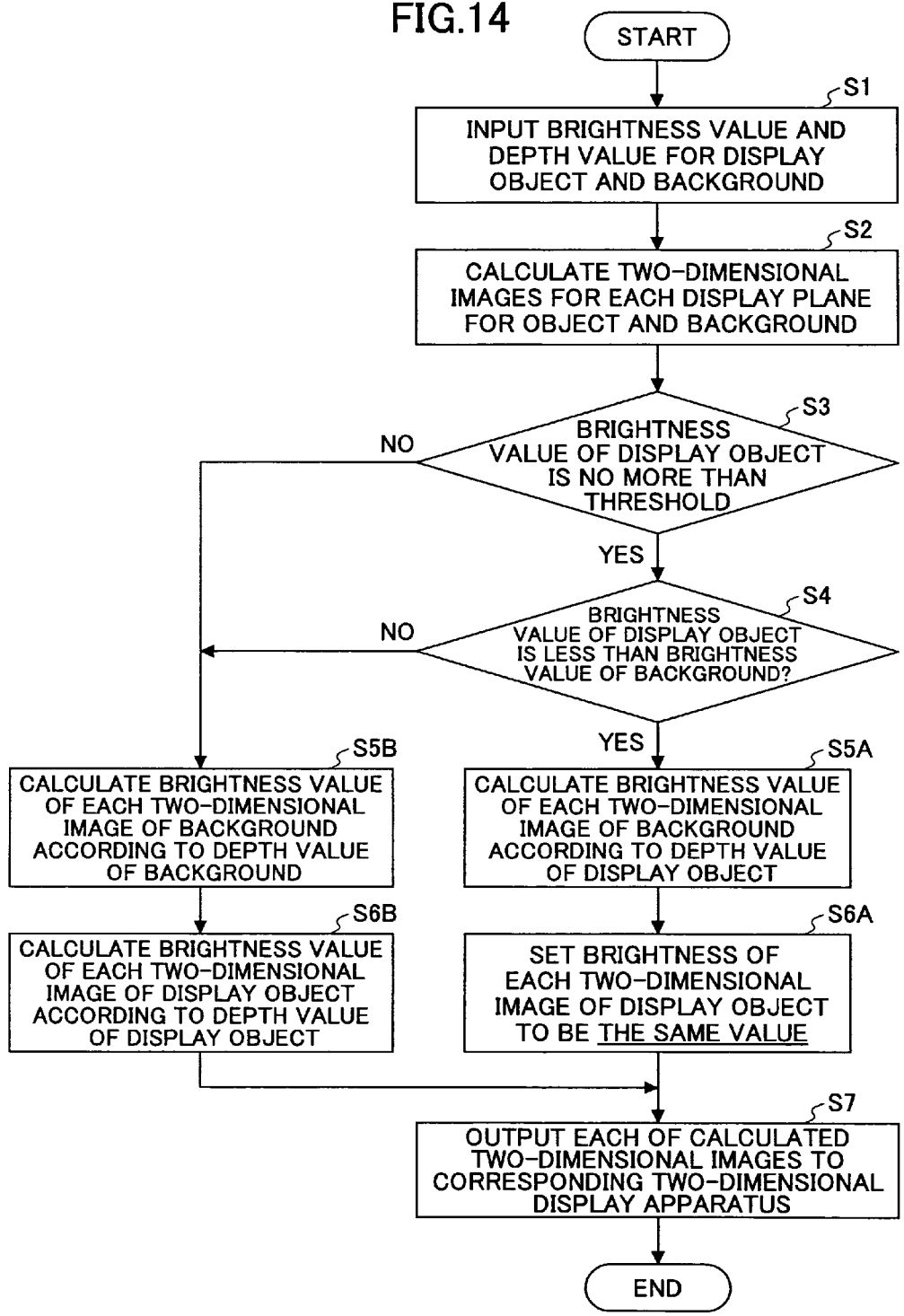
FIG. 14 is a flowchart for explaining operation of the two-dimensional image output apparatus 61.

In the flowchart shown in FIG. 14, when the brightness value of the display object is equal to or less than the predetermined threshold in step 3, it is determined whether the brightness value of the display object is less than the brightness value of the background in step 4. Then, when it is less than the brightness value of the background, the brightness values of the two-dimensional images of the display object are set to be the same. In place of such processes, when the brightness value of the display object is equal to or less than the predetermined threshold in step 3, the brightness value of the background may be changed such that the brightness value of the background becomes greater than the brightness value of the display object. In this case, when the brightness value of the display object is equal to or less than the predetermined threshold, the brightness values of the two-dimensional images of the display object are always set to be the same.

Figure 15:
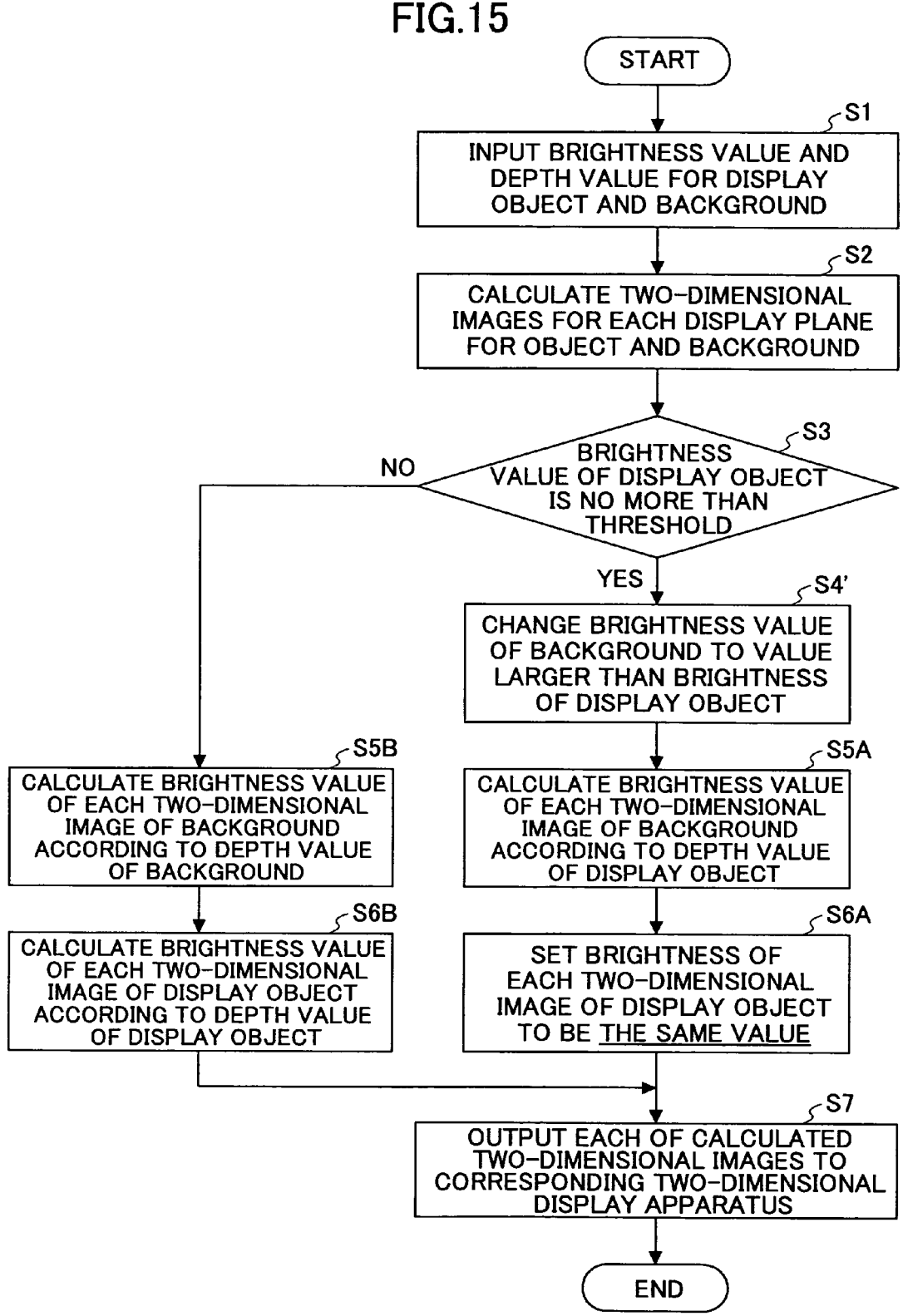
FIG. 15 is a flowchart for explaining operation of the two-dimensional image output apparatus 61.

A flowchart showing this case is shown in FIG. 15. As shown in FIG. 15, when the brightness value of the display object is equal to or less than the predetermined threshold in step 3, the brightness value calculation part 613 changes the brightness value of the background such that the brightness value of the background becomes greater than the brightness value of the display object (step 4'). By the way, when the original brightness value of the background is greater than the brightness value of the display object, the change is not necessary or the brightness value of the background may be changed to a predetermined large value such that the brightness value of the background further increases. After that, based on the changed brightness value of the background, the process of step 5A is performed. Other processes are the same as those of the processes shown in FIG. 14.

Although an example in which the display object is the character is described in this embodiment, the display object is not limited to the character. For example, a figure and the like can be used as the display object.

Embodiment 4

Figure 16A:
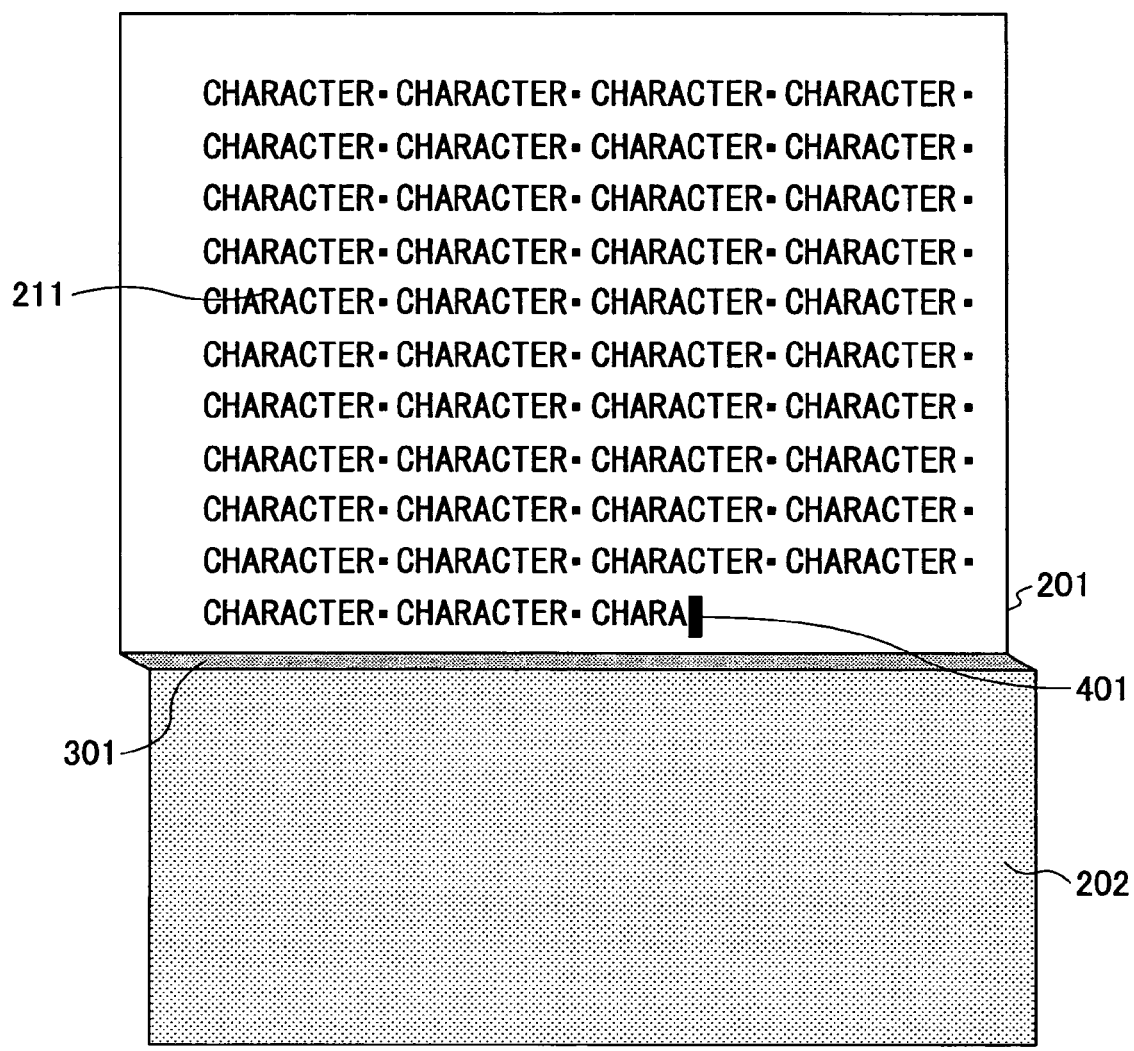
FIG. 16A is a figure showing an example in which the present invention is applied to application software such as a word processor for inputting and editing character information in the three-dimensional display apparatus of the embodiment 4 of the present invention, and is a figure showing a case in which a background plane under the line including a cursor that is a character input position is displayed with a depth position that is different from a depth position of a background of the line including the cursor and lines above the line.
Figure 16B:
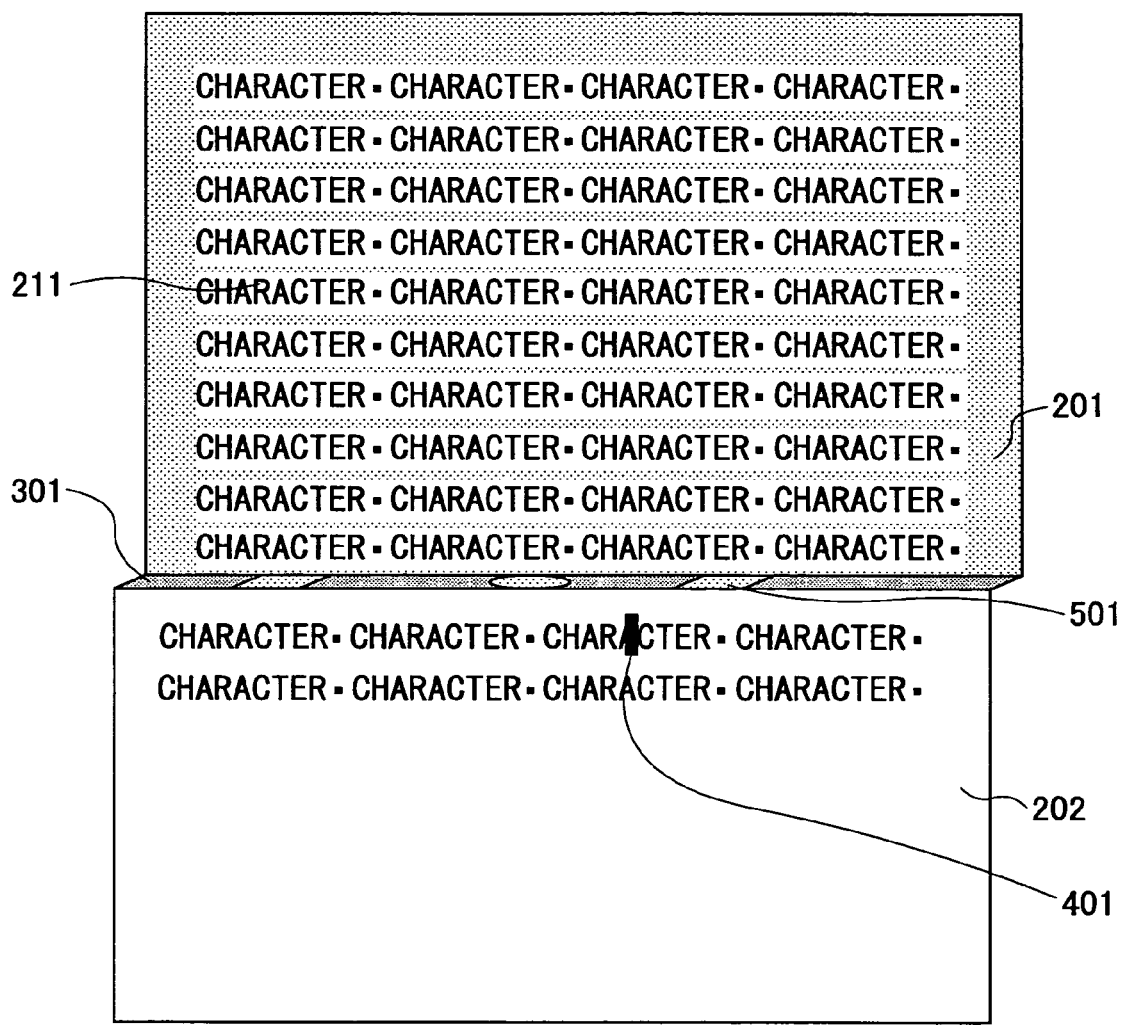
FIG. 16B is a figure showing an example in which the present invention is applied to application software such as a word processor for inputting and editing character information in the three-dimensional display apparatus of the embodiment 4 of the present invention, and is a figure showing a case in which a background plane of lines above the line including the cursor that is the input position of the character is displayed at a depth position different from a depth position of a background of the line including the cursor and lines under the line.

FIGS. 16A and B are figures showing an example in which the present invention is applied to application software such as a word processor for inputting and editing character information in the three-dimensional display apparatus of the embodiment 4 of the present invention. FIG. 16A shows a case in which a background plane under the line including a cursor that is a character input position is displayed at a depth position that is different from that of a background of the line including the cursor and lines above the line. FIG. 16B shows a case in which a background plane of lines above the line including the cursor that is the input position of the character is display at a depth position different from that of a background of the line including the cursor and lines under the line.

In this embodiment, only an area for displaying characters in the application software is shown as an image that is actually perceived by the observer 1. But, actually, as shown in FIGS. 10, 11 and 12, the background part is displayed on a plurality of display planes with different brightness and the character information are displayed on the display planes with the same brightness.

In FIGS. 16A and B, 201 and 202 are character input screens of character inputting/editing software, and 201 and 202 indicate planes each becoming a background of the character information and being perceived at a depth position by the observer 1. 211 indicates character information perceived as if it is displayed on the background plane, 301 indicates a step between two background planes that are displayed at different depth positions, and 401 shows a cursor that is the input position of the character.

In FIG. 16B, a button 501 for calling a function such as copy, cut, paste, and character search for example is provided on the step 301 between the two background planes displayed at different depth positions, wherein the function is necessary for inputting/editing the character information.

In this embodiment, by displaying the backgrounds and the character information at different depth positions using the cursor that is the input position of the character as a border between the different depth positions, there is an effect that a position at which inputting/editing is currently being performed can be perceived at a glance so that the user can easily understand and can easily use the software.

In addition, in a conventional technology, it is necessary to move a cursor to a button existing normally on a character input screen by using a mouse and the like, but as shown in FIG. 16B, by incorporating the button 501 for calling the function necessary for inputting/editing of the character on the step 301 existing near the cursor position, the function can be called with small movement of the cursor so that usability improves.

In this embodiment, the step part existing near the cursor position is provided at an angle to the perpendicular direction with respect to the display plane so that the surface of the step part can be seen. As a result, the upper surface of the button for calling the function necessary for inputting/editing of the character is seen. But, even when the step part is perpendicular to the display plane so that the surface of the step par cannot be seen, by forming the button for calling the function as a shape extending from the surface of the step part, the observer 1 can ascertain the position of the button so as to operate the button.

By the way, in FIG. 16A, the background plane 201 is perceived to be placed in front of the background plane 202 as seen from the observer 1, and in FIG. 16B, the background plane 202 is perceived to be placed in front of the background plane 201 as seen from the observer 1. But, the relationship of the depth positions may be reversed between the background plane 201 and the background plane 202, and it is needless to say that the same effect can be obtained.

In addition, in the cases shown in FIGS. 16A and 16B, when the input or edit of characters proceeds so that the position of the cursor 401 moves to a line next to the line shown in the figure, the position of the step part 301 between the 201 and 202 that are character input screens of the character input/edit software shifts downward by one line. At the time, the display of the step may be instantaneously changed with the movement of the cursor, or the step may be gradually moved from the original position to the next line like an animation, and the same effect can be obtained in both cases. By the way, the method for gradually changing the position of the step can be realized by using the before-mentioned method for the moving picture reproduction.

The display shown in FIGS. 16A and 16B can be performed by the two-dimensional image output apparatus having the function parts shown in FIG. 13. In this case, the two-dimensional image output apparatus includes an application part in addition to the function parts shown in FIG. 13, and the application part passes the brightness values and the depth values of the display object (character) and the background to the two-dimensional calculation part 611, the brightness determination part 612 and the brightness value calculation part 613.

In the case of FIG. 16A, the background is divided into a background of the line including the cursor and lines before the line (upside), and a background of lines after the line including the cursor (downside), and different depth positions are used for the character and the cursor between the upside background and the downside background, and the depth value of the background itself is set to be the same as the depth value of the character placed on the downside background. Then, the brightness value calculation part 613 calculates the brightness value of each two-dimensional image of the upside background part according to the depth value of the character or the cursor (step 5A). When a character exists on the downside background part, the brightness value calculation part 613 calculates the brightness value of each two-dimensional image of the downside background part according to the depth value of the character (step SA). When the character does not exist on the downside background part, the brightness value calculation part 613 calculates the brightness value of each two-dimensional image of the downside background part according to the depth value of the background part (step 5B). Accordingly, the depth position of the downside background can be constant irrespective of presence or absence of the character.

In the case of FIG. 16B, the background is divided into a background of lines before the line existing the cursor (upside), and a background of the line including the cursor and lines after the line including the cursor (downside), and different depth positions are used for the characters and the cursors between the upside background and the downside background, and the depth value of the background itself is set to be the same as the depth value of the character placed on the upside background. Accordingly, the depth position of the upside background can be constant irrespective of presence or absence of the character. In addition, as to the step part, the brightness value calculation part 613 calculates the brightness value of each two-dimensional image according to depth values given such that solidity of the step part can be perceived.

Embodiment 5

Figure 17:
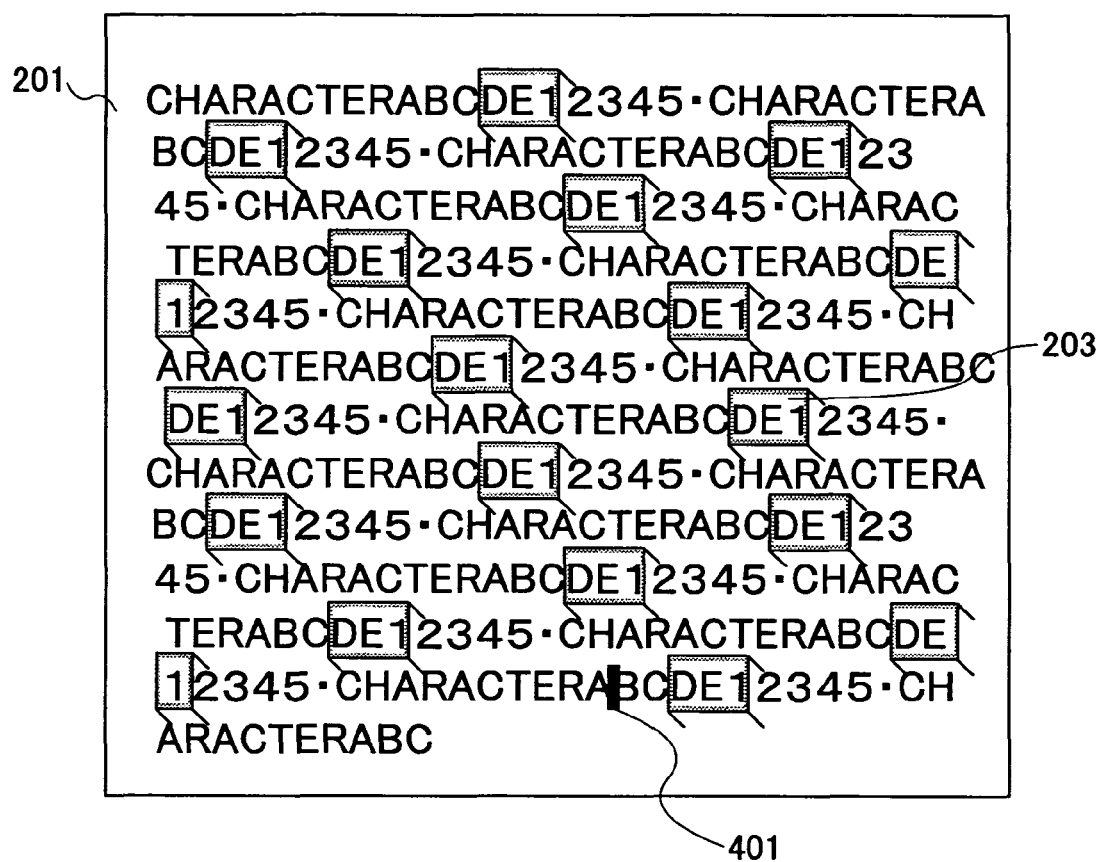
FIG. 17 is a figure showing an example in which the present invention is applied to application software such as a word processor for inputting and editing character information in the three-dimensional display apparatus of the embodiment 5 of the present invention, and is a figure showing an example for displaying a background of a character string that is a result of a search in a document at a depth position different from that of other backgrounds.

FIG. 17 is a figure showing an example in which the present invention is applied to application software such as a word processor for inputting and editing character information in the three-dimensional display apparatus of the embodiment 5 of the present invention, and FIG. 17 shows an example for displaying a background of a character string that is a result of a search in a document at a depth position different from that of other backgrounds.

Also in FIG. 17, like FIGS. 16A and B, only an area for displaying characters of the application software is shown as an image that is actually perceived by the observer 1.

In FIG. 17, 201 indicates a background plane of the character input screen, 203 indicates a background of the searched character string part. The background 203 is displayed such that it is perceived to be in front of the background plane 201 of the character input screen by the user, so that there is an effect that the search result can be easily perceived for the user.

As mentioned above, it is effective to display the searched character in front of other part for emphasizing the searched character. But, only for displaying the searched character string more distinctively than the other part, such display can be available also by displaying the background 203 of the searched character string part at back of the background plane 201 of the character input screen. It is needless to say that the effect of the present invention can be obtained also in this case.

In addition, in this embodiment, the display position of the background of the searched character may be changed instantaneously at the same time when the search result is found, or the display position of the background of the searched character may be changed gradually from the original display position to the display position representing the searched character like an animation. In both cases, obtained effect is not different, and the realizing measure is the same as described in the embodiment 4.

As described in the embodiment 4, this embodiment can be also realized by providing an application part to the two-dimensional image output apparatus shown in FIG. 13. In this embodiment, for example, the application part passes image information (range, etc.) of the background part corresponding to the searched character to the two-dimensional image calculation part 611, and passes the depth value of the character at the searched part to the brightness value calculation part 613. Then, the brightness value calculation part 613 calculates the brightness value of each two-dimensional image according to the range and the depth value of the background part.

Embodiment 6

Figure 18:
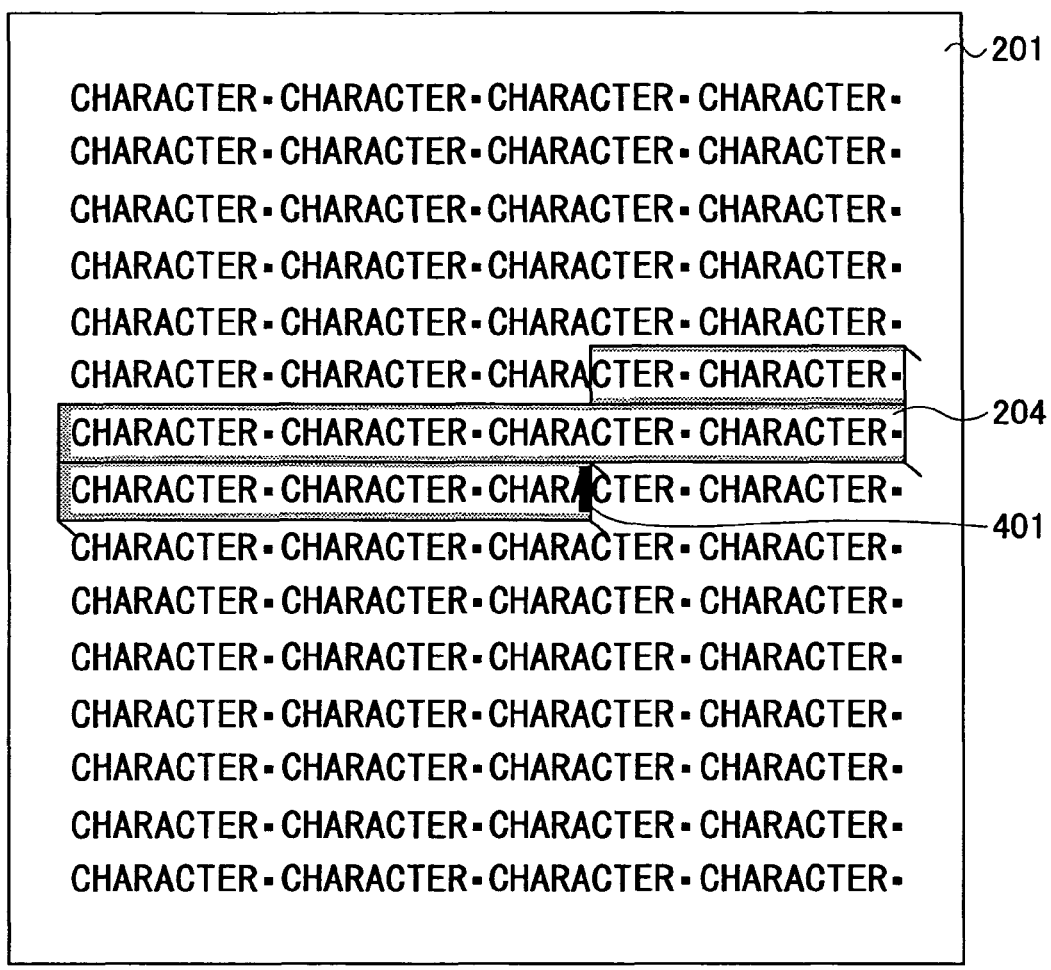
FIG. 18 is a figure showing an example in which the present invention is applied to application software such as a word processor for inputting and editing character information in the three-dimensional display apparatus of the embodiment 6 of the present invention, and is a figure showing an example in which, when a character string in a document is in a selected state, the background of the selected part is displayed at a depth position different from that of other backgrounds.

FIG. 18 is a figure showing an example in which the present invention is applied to application software such as a word processor for inputting and editing character information in the three-dimensional display apparatus of the embodiment 6 of the present invention, and FIG. 18 shows an example in which, when a character string in a document is in a selected state, the background of the selected part is displayed at a depth position different from that of other backgrounds.

Also in FIG. 18, like FIGS. 16A, B and 17, only an area for displaying characters of the application software is shown as an image that is actually perceived by the observer 1.

In FIG. 18, 201 indicates a background plane of the character input screen, 204 indicates a background of the selected character string part. The background 204 is displayed such that it is perceived to be in front of the background plane 201 of the character input screen by the user, so that there is an effect that the selected character part can be easily perceived for the user.

As mentioned above, it is effective to display the selected character in front of other part for emphasizing the selected character. But, only for displaying the selected character string more distinctively than the other part, such display can be available also by displaying the background 204 of the selected character string part at back of the background plane 201 of the character input screen. It is needless to say that the effect of the present invention can be obtained also in this case.

In addition, in this embodiment, the display position of the background of the selected character may be changed instantaneously at the same time when the character enters the elected state, or the display position of the background of the searched character may be changed gradually from the original display position to the display position representing the searched character like an animation. In both cases, obtained effect is not different, and the realizing measure is the same as described in the embodiments 4 and 5.

As described in the embodiment 4, this embodiment can be also realized by providing an application part to the two-dimensional image output apparatus shown in FIG. 13. In this embodiment, for example, the application part passes image information (range, etc.) of the background part corresponding to the selected character to the two-dimensional image calculation part 611, and passes the depth value of the character at the part to the brightness value calculation part 613. Then, the brightness value calculation part 613 calculates the brightness value of each two-dimensional image according to the range and the depth value of the background part.

In the above descriptions, examples for applying the present invention to the application software for inputting/editing of the character information separately. But, in the present invention, since the depth position of the background plane of the character can be arbitrarily set, the same effect can be obtained when carrying out the embodiments shown in FIGS. 16A-18 at the same time by adjusting each emphasized depth position.

Embodiment 7

Figure 19:
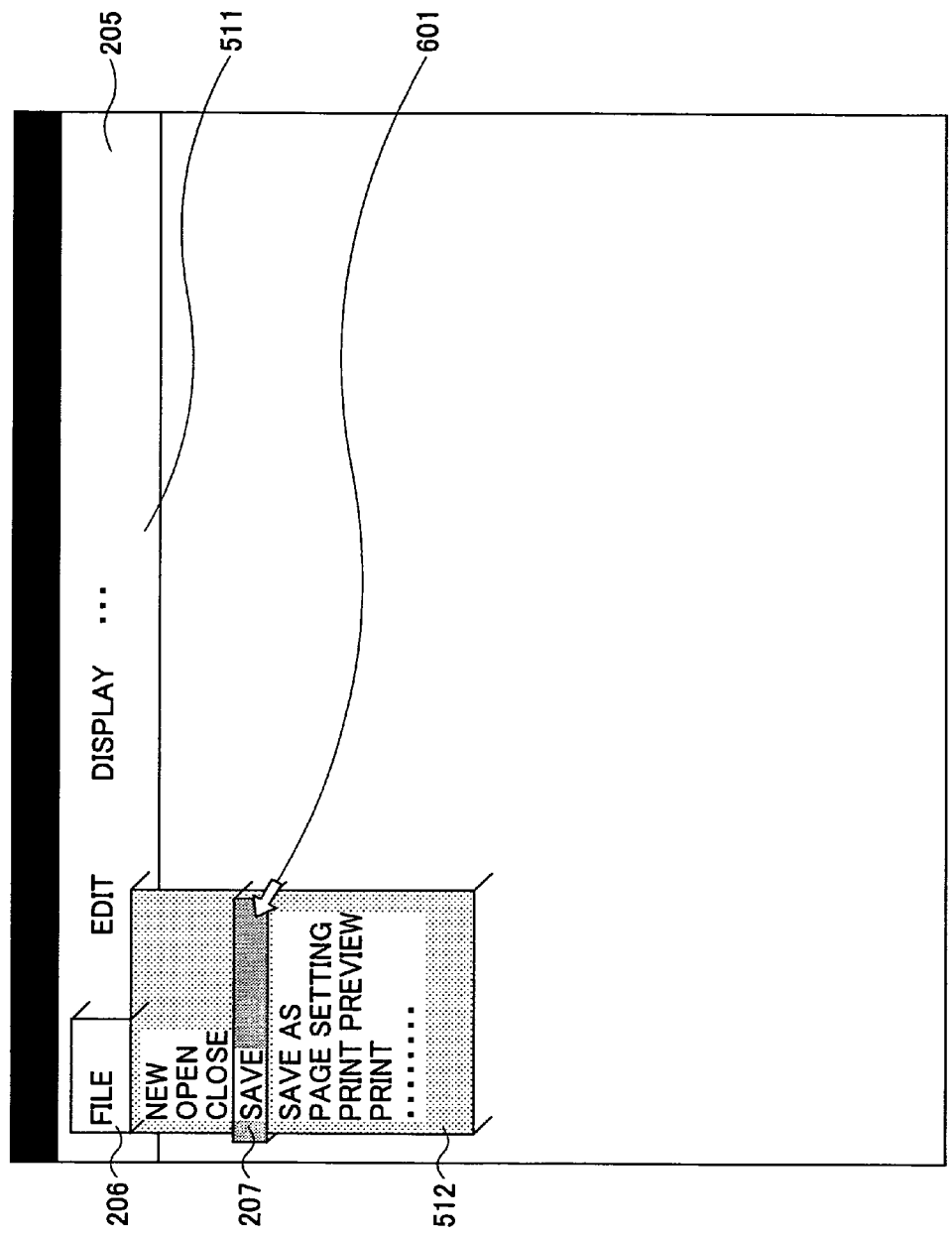
FIG. 19 is a figure showing a case in which the present invention is applied to a menu of various applications or operating systems in the three-dimensional display apparatus of the embodiment 7 of the present invention.

FIG. 19 shows a case in which the present invention is applied to a menu of various applications or operating systems in the three-dimensional display apparatus of the embodiment 7 of the present invention.

In FIG. 19, 522 indicates a menu of an application and the like, 512 indicates a sub-menu, 601 indicates a pointer, 205 is a background plane of the menu, 206 indicates a background plane of the sub-menu, and 207 indicates a background plane of a selected menu.

In this embodiment 7, similarly to a normal two-dimensional display, the pointer 601 is moved to an item of the menu 511 using a mouse and the like. Then, by clicking the item with a button of the mouse in some situations, the background 206 of the selected item of the menu is displayed at a depth position different from that of other backgrounds, and the sub-menu 512 is displayed with a background displayed at the same depth position.

Then, by further moving the pointer 601 to point at an item in the sub-menu 512, and by clicking a mouse button according to circumstances, the background 207 of the selected menu is displayed at a depth position different from that of the background 206 of the sub-menu. Accordingly, the currently selected menu is displayed such that it is easily perceived by the user so that usability can be improved.

In addition, in this embodiment, the depth position of the background may be changed instantaneously at the same time when pointing at the menu with the pointer 601, or may be changed gradually like an animation. In both cases, the same effect can be obtained, and the realizing method is the same as that in the case of the embodiments 4, 5 and 6.

As described in the embodiment 4, this embodiment can be also realized by providing an application part to the two-dimensional image output apparatus shown in FIG. 13. In this embodiment, for example, the application part passes the image information (range and the like) of the menu part selected by the mouse to the two-dimensional image calculation part 611, and passes the depth value of the character of the part to the brightness value calculation part 613, so that the brightness value calculation part 613 calculates the brightness value of each two-dimensional image according to the range and the depth value of the part.

As describe above, according to this embodiment, a relatively small-sized character that is displayed with low brightness compared with the background can be displayed at an arbitrary depth position in an three-dimensional display method that can display a stereoscopic image with high resolution by overlapping two-dimensional images and by changing each brightness independently.

In addition, by applying this invention to the application for inputting/editing character information, application software that can be easily used can be provided in which an input/edit position of the character, a position of the search result or a position of the selected character can be easily perceived by the user.

Example of Using the Transparency Distribution Type DFD Display Apparatus

In the above embodiments 1-7, descriptions are given base on the brightness distribution type DFD display apparatus shown in FIG. 1. When using the transparency distribution type DFD display apparatus shown in FIG. 8, following processes may be performed in each above embodiment.

That is, when displaying a display object having brightness brighter than the background, two-dimensional images of the background are displayed on a plurality of transmissive display apparatuses by distributing transparency, and two-dimensional images of the display object are displayed on the plurality of transmissive display apparatuses with the same transparency.

Figure 20:
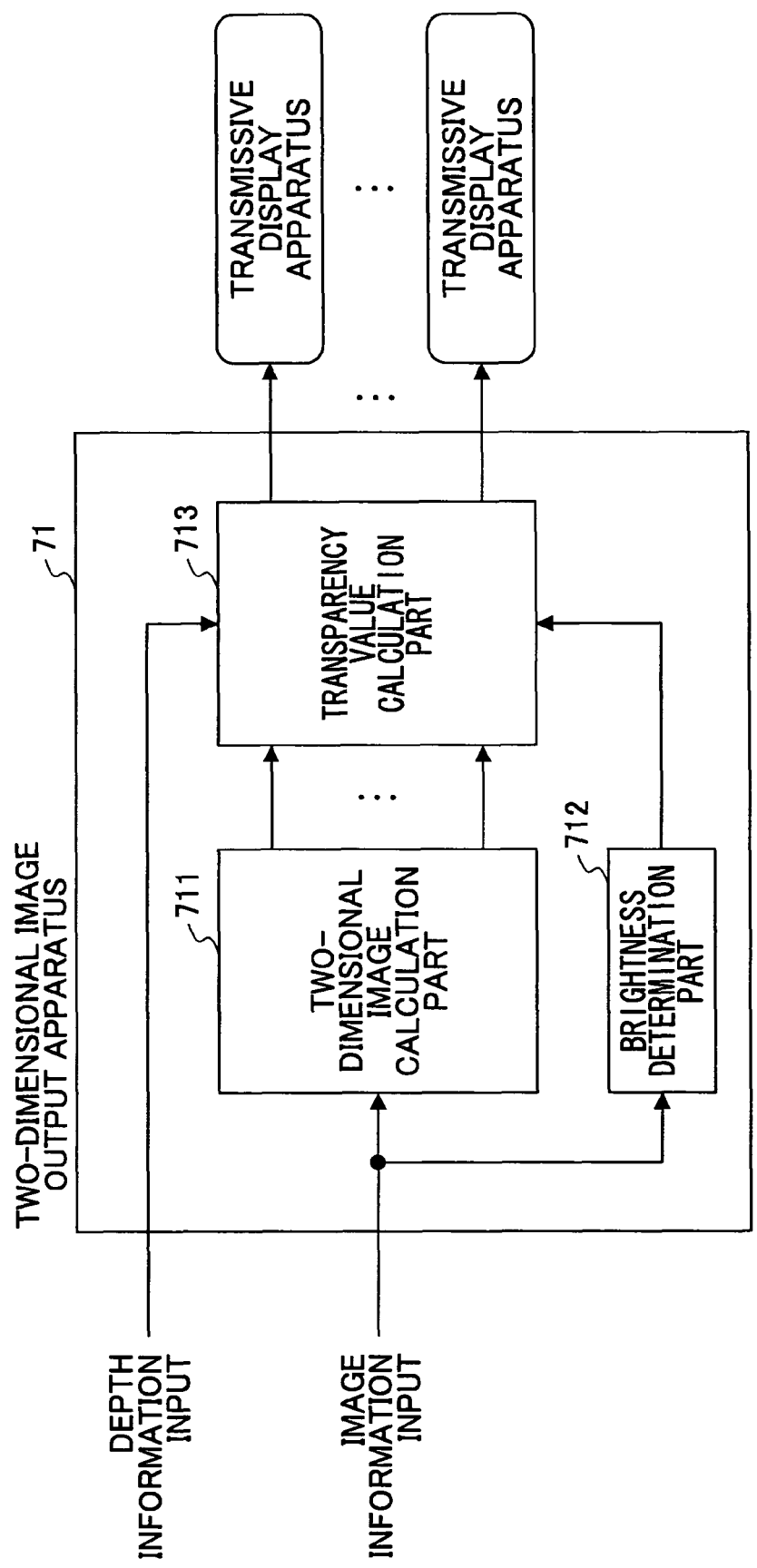
FIG. 20 is a figure showing a functional configuration example of the two-dimensional image output apparatus 71.

FIG. 20 shows a functional configuration example of the two-dimensional image output apparatus 71 when using the transparency distribution type DFD display apparatus.

As shown in FIG. 20, the two-dimensional image output apparatus 71 includes a two-dimensional image calculation part 711 for calculating each two-dimensional image to be displayed on the transmissive display apparatus based on input image information, a brightness determination part 712 for performing threshold determination for the brightness value based on the input image information, and a transparency value calculation part 713 for performing processes for calculating the transparency value of each two-dimensional image to be displayed on the transmissive display apparatus based on depth information. In addition, the transmissive display apparatuses that form each display plane are connected.

Like the two-dimensional image output apparatus 61, the two-dimensional image output apparatus 71 can be realized using a general computer including a CPU, a storage and the like. Each of the above-mentioned function parts is realized by executing a program of the present invention on the computer.

Next, operation of the two-dimensional image output apparatus 71 is described with reference to a flowchart of FIG. 21.

In the operation, it is assumed that the range of the background for the display object is specified beforehand and image information including the specified range is input into the two-dimensional image output apparatus 71. In addition, a predetermined threshold to be compared with the brightness value of the display object is prepared, and is stored in the storage.

First, when the brightness values and the depth values of the display object and the background are input into the two-dimensional image apparatus 71 as the image information and the depth information (step 11), the two-dimensional image calculation part 711 calculates two-dimensional images of the display object and the background for each display plane (step 12).

In addition, the brightness determination part 712 determines whether the brightness value of the display object is equal to or greater than the predetermined threshold (step 13). When the rightness value of the display object is equal to or greater than the predetermined threshold, the brightness determination part 712 determines whether the brightness value of the display object is grater than the brightness value of the background (step 14). When the brightness value of the display object is grater than the brightness value of the background, the transparency value calculation part 713 calculates transparency values of each two-dimensional image of the background according to the depth value of the display object (step 15A). Then, the transparency value calculation part 713 sets transparency values of each two-dimensional image of the display object to be the same value (step 16A). When setting the transparency values of each two-dimensional image of the display object to be the same value, the transparency is set such that overall brightness perceived when the displayed two-dimensional images are overlapped becomes the same as the brightness of the display object. Then, each of the calculated two-dimensional images are output to a corresponding transmissive display apparatus (step 17).

When the brightness value of the display object is less than the threshold in step 13, or when the brightness value of the display object is equal to or less than the brightness value of the background in step 14, the transparency value calculation part 713 calculates the transparency values of each two-dimensional image of the background according to the depth value of the background (step 15B), and calculates the transparency value of each two-dimensional image of the display object according to the depth value of the display object (step 16B). Then, each of the calculated two-dimensional images is output to a corresponding transmissive display apparatus (step 17).

Figure 21:
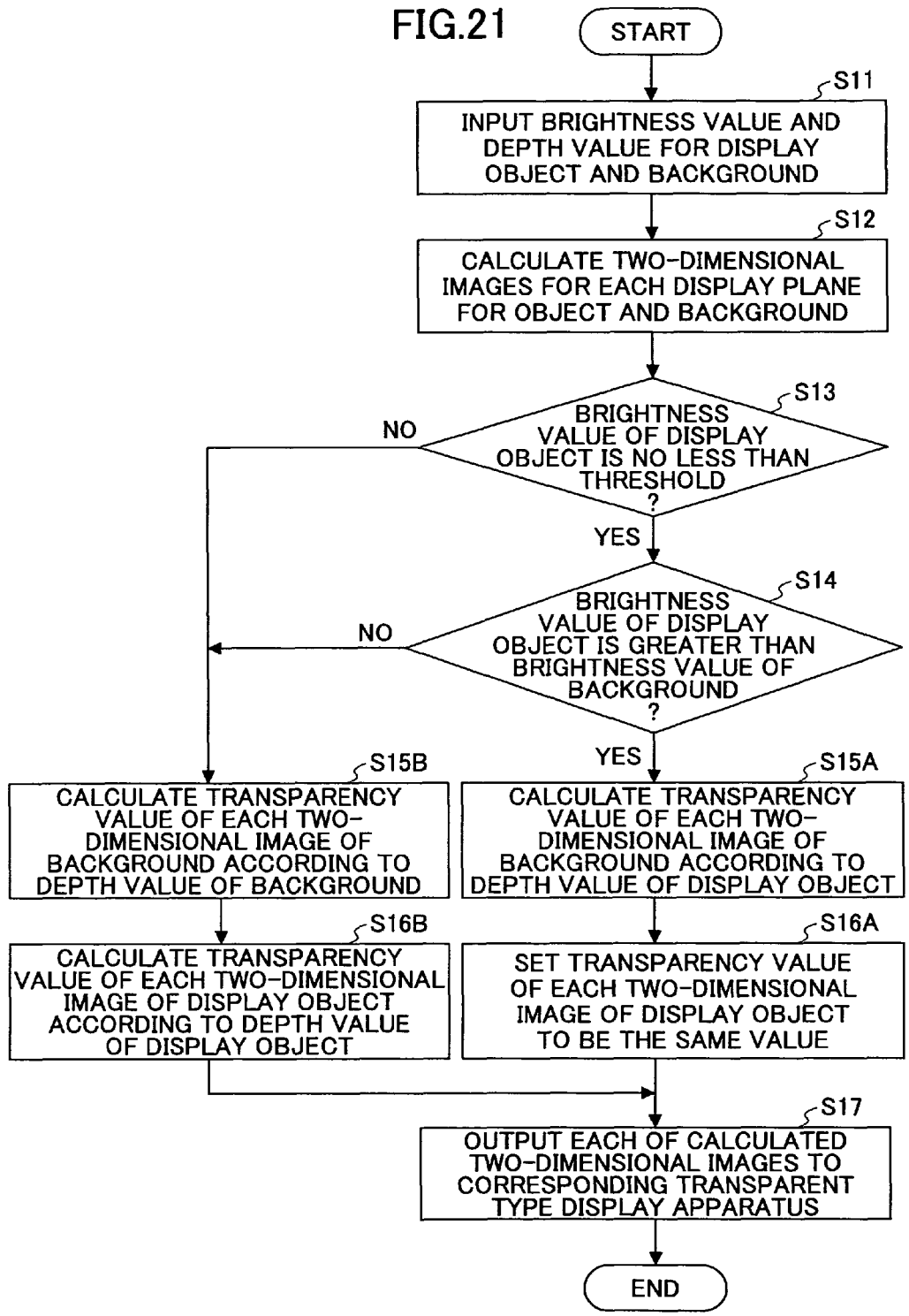
FIG. 21 is a flowchart for describing operation of the two-dimensional image output apparatus 71.

In the flowchart shown in FIG. 21, when the brightness value of the display object is equal to or greater than the predetermined threshold in step 13, it is determined whether the brightness value of the display object is greater than the brightness value of the background in step 14. Then, when it is greater than the brightness value of the background, the transparency values of the two-dimensional images of the display object are set to be the same. In place of such processes, when the brightness value of the display object is equal to or greater than the predetermined threshold in step 13, the brightness value of the background may be changed such that the brightness value of the background becomes less than the brightness value of the display object. In this case, when the brightness value of the display object is equal to or greater than the predetermined threshold, the transparency values of the two-dimensional images of the display object are always set to be the same.

Figure 22:
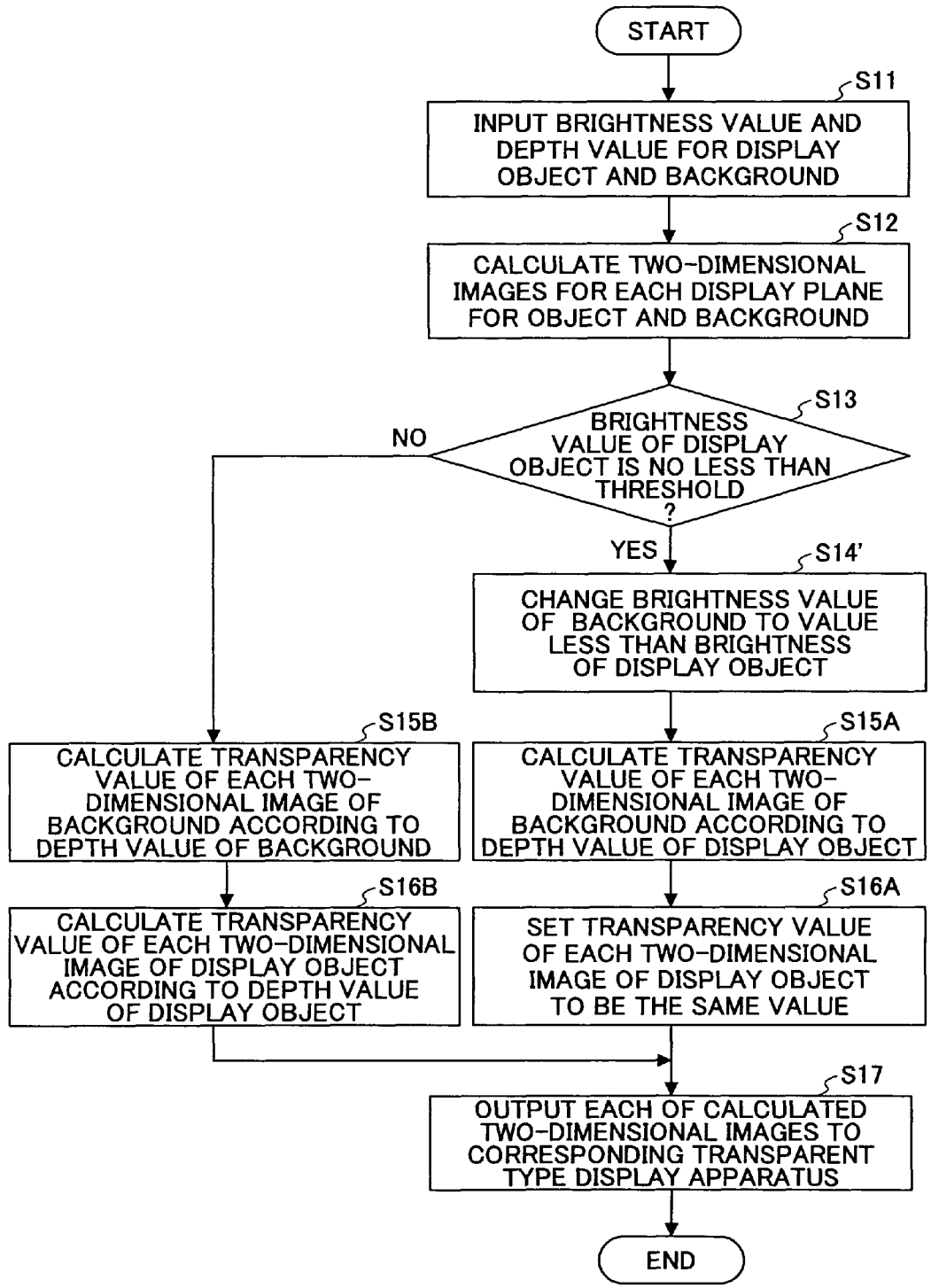
FIG. 22 is a flowchart for describing operation of the two-dimensional image output apparatus 71.

A flowchart showing this case is shown in FIG. 22. As shown in FIG. 22, when the brightness value of the display object is equal to or grater than the predetermined threshold in step 13, the transparency value calculation part 713 changes the brightness value of the background such that the brightness value of the background becomes less than the brightness value of the display object (step 14'). By the way, when the original brightness value of the background is less than the brightness value of the display object, the change is not necessary or the brightness value of the background may be changed to a predetermined small value such that the brightness value of the background further decreases. After that, based on the changed brightness value of the background, the process of step 15A is performed. Other processes are the same as those of the processes shown in FIG. 21.

The present invention contrived by the inventor is concretely described based on embodiments. The present invention is not limited to the specifically disclosed embodiments, and variations and modifications may be made without departing from the scope of the invention.

The invention claimed is:

1. A three-dimensional display method for displaying two-dimensional images, by changing brightness, on a plurality of display planes placed at different depth positions as seen from an observer to display a three-dimensional stereoscopic image, the method comprising:

generating first two-dimensional images that are obtained by projecting a background plane onto the plurality of display planes along a line of sight of the observer, and displaying the first two-dimensional images on the display planes respectively wherein brightness of each of the first two-dimensional images is determined independently for each display plane according to a depth position of a display object in a three-dimensional space when brightness of the display object is darker than that of the background plane; and generating second two-dimensional images that are obtained by projecting the display object onto the plurality of display planes along the line of sight of the observer, and displaying the second two-dimensional images on the display planes respectively in which brightness of each of the second two-dimensional images is set to be the same among the display planes irrespective of the depth position of the display object when the brightness of the display object is darker than that of the background plane, wherein, the display object is character information;

the background plane is a background of a screen on which the character information is input or edited; and a background plane of lines after a line including a cursor indicating an inputting or editing position of the character information is displayed at a depth position different from a depth position at which a background plane of the line including the cursor and lines before the line including the cursor is displayed.

2. A three-dimensional display method for displaying two-dimensional images, by changing brightness, on a plurality of display planes placed at different depth positions as seen from an observer to display a three-dimensional stereoscopic image, the method comprising:

generating first two-dimensional images that are obtained by projecting a background plane onto the plurality of display planes along a line of sight of the observer, and displaying the first two-dimensional images on the display planes respectively wherein brightness of each of the first two-dimensional images is determined independently for each display plane according to a depth position of a display object in a three-dimensional space when brightness of the display object is darker than that of the background plane; and generating second two-dimensional images that are obtained by projecting the display object onto the plurality of display planes along the line of sight of the observer, and displaying the second two-dimensional images on the display planes respectively in which brightness of each of the second two-dimensional images is set to be the same among the display planes irrespective of the depth position of the display object when the brightness of the display object is darker than that of the background plane, wherein, the display object is character information;

the background plane is a background of a screen on which the character information is input or edited; and a background plane of a line including a cursor indicating an inputting or editing position of the character information and lines after the line including the cursor is displayed at a depth position different from a depth position at which a background plane of lines before the line including the cursor is displayed.

3. A three-dimensional display method for displaying two-dimensional images, by changing brightness, on a plurality of display planes placed at different depth positions as seen from an observer to display a three-dimensional stereoscopic image, the method comprising:

generating first two-dimensional images that are obtained by projecting a background plane onto the plurality of display planes along a line of sight of the observer, and displaying the first two-dimensional images on the display planes respectively wherein brightness of each of the first two-dimensional images is determined independently for each display plane according to a depth position of a display object in a three-dimensional space when brightness of the display object is darker than that of the background plane; and generating second two-dimensional images that are obtained by projecting the display object onto the plurality of display planes along the line of sight of the observer, and displaying the second two-dimensional images on the display planes respectively in which brightness of each of the second two-dimensional images is set to be the same among the display planes irrespective of the depth position of the display object when the brightness of the display object is darker than that of the background plane, wherein, the display object is character information;

the background plane is a background of a table or a menu in which character information are arranged and from which a piece of character information can be selected; and a background plane of a selected character information part is displayed at a depth position different from a depth position at which a background plane of other character information is displayed.

4. A three-dimensional display apparatus for displaying two-dimensional images, by changing brightness, on a plurality of display planes placed at different depth positions as seen from an observer to display a three-dimensional stereoscopic image, the apparatus comprising:

first means for generating first two-dimensional images that are obtained by projecting a background plane onto the plurality of display planes along a line of sight of the observer;

second means for displaying the first two-dimensional images generated by the first means on the display planes respectively wherein brightness of each of the first two-dimensional images is determined independently for each display plane according to a depth position of a display object in a three-dimensional space when brightness of the display object is darker than that of the background plane so as to display the background plane at an arbitrary position in the three dimensional space;

third means for generating second two-dimensional images that are obtained by projecting the display object onto the plurality of display planes along the line of sight of the observer; and fourth means for displaying the second two-dimensional images generated by the third means on the display planes respectively in which brightness of each of the second two-dimensional images is set to be the same among the display planes irrespective of the depth position of the display object when the brightness of the display object is darker than that of the background plane, wherein, the display object is character information;

the background plane is a background of a screen on which the character information is input or edited; and the second means displays a background plane of lines after a line including a cursor indicating an inputting or editing position of the character information at a depth position different from a depth position at which a background plane of the line including the cursor and lines before the line including the cursor is displayed.

5. A three-dimensional display apparatus for displaying two-dimensional images, by changing brightness, on a plurality of display planes placed at different depth positions as seen from an observer to display a three-dimensional stereoscopic image, the apparatus comprising:

first means for generating first two-dimensional images that are obtained by projecting a background plane onto the plurality of display planes along a line of sight of the observer;

second means for displaying the first two-dimensional images generated by the first means on the display planes respectively wherein brightness of each of the first two-dimensional images is determined independently for each display plane according to a depth position of a display object in a three-dimensional space when brightness of the display object is darker than that of the background plane so as to display the background plane at an arbitrary position in the three dimensional space;

third means for generating second two-dimensional images that are obtained by projecting the display object onto the plurality of display planes along the line of sight of the observer; and fourth means for displaying the second two-dimensional images generated by the third means on the display planes respectively in which brightness of each of the second two-dimensional images is set to be the same among the display planes irrespective of the depth position of the display object when the brightness of the display object is darker than that of the background plane, wherein, the display object is character information;

the background plane is a background of a screen on which the character information is input or edited; and the second means displays a background plane of a line including a cursor indicating an inputting or editing position of the character information and lines after the line including the cursor at a depth position different from a depth position at which a background plane of lines before the line including the cursor is displayed.

6. A three-dimensional display apparatus for displaying two-dimensional images, by changing brightness, on a plurality of display planes placed at different depth positions as seen from an observer to display a three-dimensional stereoscopic image, the apparatus comprising:

first means for generating first two-dimensional images that are obtained by projecting a background plane onto the plurality of display planes along a line of sight of the observer;

second means for displaying the first two-dimensional images generated by the first means on the display planes respectively wherein brightness of each of the first two-dimensional images is determined independently for each display plane according to a depth position of a display object in a three-dimensional space when brightness of the display object is darker than that of the background plane so as to display the background plane at an arbitrary position in the three dimensional space;

third means for generating second two-dimensional images that are obtained by projecting the display object onto the plurality of display planes along the line of sight of the observer; and fourth means for displaying the second two-dimensional images generated by the third means on the display planes respectively in which brightness of each of the second two-dimensional images is set to be the same among the display planes irrespective of the depth position of the display object when the brightness of the display object is darker than that of the background plane, wherein, the display object is character information;

the background plane is a background of a table or a menu in which character information are arranged and from which a piece of character information can be selected; and the second means displays a background plane of a selected character information part at a depth position different from a depth position at which a background plane of other character information is displayed.

7. A two-dimensional image generation method executed by a two-dimensional image output apparatus for displaying two-dimensional images, by changing brightness, on a plurality of display planes placed at different depth positions as seen from an observer to display a three-dimensional stereoscopic image, comprising:

a two-dimensional image calculation step of calculating two-dimensional images, each corresponding to a display plane, of a display object and a background from image information of the display object and the background;

a brightness value determination step of determining whether a brightness value of the display object is equal to or less than a predetermined threshold and the brightness value of the display object is less than a brightness value of the background; and a brightness value calculation step of, when it is determined that the brightness value of the display object is equal to or less than the predetermined threshold and the brightness value of the display object is less than the brightness value of the background, calculating the brightness value of each two-dimensional image of the background according to depth information of the display object and setting brightness values of the two-dimensional images of the display object to be the same.

8. A two-dimensional image generation method executed by a two-dimensional image output apparatus for displaying two-dimensional images, by changing brightness, on a plurality of display planes placed at different depth positions as seen from an observer to display a three-dimensional stereoscopic image, comprising:

a two-dimensional image calculation step of calculating two-dimensional images, each corresponding to a display plane, of a display object and a background from image information of the display object and the background;

a brightness value determination step of determining whether a brightness value of the display object is equal to or less than a predetermined threshold; and a brightness value calculation step of, when the brightness value of the display object is equal to or less than the predetermined threshold, changing the brightness value of the background to a value greater than the brightness value of the display object, and calculating the brightness value of each two-dimensional image of the background based on the changed brightness value according to depth information of the display object and setting brightness values of the two-dimensional images of the display object to be the same.

9. A two-dimensional image generation method executed by a two-dimensional image output apparatus for displaying two-dimensional images, by changing transparency, on a plurality of display planes placed at different depth positions as seen from an observer to display a three-dimensional stereoscopic image, comprising:

a two-dimensional image calculation step of calculating two-dimensional images, each corresponding a display plane, of a display object and a background from image information of the display object and the background;

a brightness value determination step of determining whether a brightness value of the display object is equal to or greater than a predetermined threshold and the brightness value of the display object is greater than a brightness value of the background; and a transparency value calculation step of, when it is determined that the brightness value of the display object is equal to or greater than the predetermined threshold and the brightness value of the display object is greater than the brightness value of the background, calculating a transparency value of each two-dimensional image of the background according to depth information of the display object and setting transparency values of the two-dimensional images of the display object to be the same.

10. A two-dimensional image generation method executed by a two-dimensional image output apparatus for displaying two-dimensional images, by changing transparency, on a plurality of display planes placed at different depth positions as seen from an observer to display a three-dimensional stereoscopic image, comprising:

a two-dimensional image calculation step of calculating two-dimensional images, each corresponding a display plane, of a display object and a background from image information of the display object and the background;

a brightness value determination step of determining whether a brightness value of the display object is equal to or greater than a predetermined threshold; and a transparency value calculation step of, when the brightness value of the display object is equal to or greater than the predetermined threshold, changing the brightness value of the background to a value less than the brightness value of the display object, and calculating the transparency value of each two-dimensional image of the background based on the changed brightness value according to depth information of the display object and setting transparency values of the two-dimensional images of the display object to be the same.

11. A two-dimensional image output apparatus for displaying two-dimensional images, by changing brightness, on a plurality of display planes placed at different depth positions as seen from an observer to display a three-dimensional stereoscopic image, comprising:

two-dimensional image calculation means for calculating two-dimensional images, each corresponding to a display plane, of a display object and a background from image information of the display object and the background;

brightness value determination means for comparing a brightness value of the display object with another brightens value; and brightness value calculation means for calculating a brightness value of each two-dimensional image of the display object and the background based on the two-dimensional images calculated by the two-dimensional image calculation means and depth information of the display object and the background;

wherein, when it is determined that the brightness value of the display object is equal to or less than a predetermined threshold and the brightness value of the display object is less than the brightness value of the background by the brightness determination means, the brightness value calculation means calculates the brightness value of each two-dimensional image of the background according to depth information of the display object and sets brightness values of the two-dimensional images of the display object to be the same.

12. A two-dimensional image output apparatus for displaying two-dimensional images, by changing brightness, on a plurality of display planes placed at different depth positions as seen from an observer to display a three-dimensional stereoscopic image, comprising:

two-dimensional image calculation means for calculating two-dimensional images, each corresponding to a display plane, of a display object and a background from image information of the display object and the background;

brightness value determination means for comparing a brightness value of the display object with another brightens value; and brightness value calculation means for calculating a brightness value of each two-dimensional image of the display object and the background based on the two-dimensional images calculated by the two-dimensional image calculation means and depth information of the display object and the background;

wherein, when it is determined that the brightness value of the display object is equal to or less than a predetermined threshold by the brightness determination means, the brightness value calculation means changes the brightness value of the background to a value greater than the brightness value of the display object, and calculates the brightness value of each two-dimensional image of the background based on the changed brightness value according to depth information of the display object and sets brightness values of the two-dimensional images of the display object to be the same.

13. A two-dimensional image output apparatus for displaying two-dimensional images, by changing transparency, on a plurality of transmissive display apparatuses placed at different depth positions as seen from an observer to display a three-dimensional stereoscopic image, comprising:

two-dimensional image calculation means for calculating two-dimensional images, each corresponding to a transmissive display apparatus, of a display object and a background from image information of the display object and the background;

brightness value determination means for comparing a brightness value of the display object with another brightens value; and transparency value calculation means for calculating a brightness value of each two-dimensional image of the display object and the background based on the two-dimensional images calculated by the two-dimensional image calculation means and depth information of the display object and the background;

wherein, when it is determined that the brightness value of the display object is equal to or greater than a predetermined threshold and the brightness value of the display object is greater than the brightness value of the background by the brightness determination means, the transparency value calculation means calculates a transparency value of each two-dimensional image of the background according to depth information of the display object and sets transparency values of the two-dimensional images of the display object to be the same.

14. A two-dimensional image output apparatus for displaying two-dimensional images, by changing transparency, on a plurality of transmissive display apparatuses placed at different depth positions as seen from an observer to display a three-dimensional stereoscopic image, comprising:

two-dimensional image calculation means for calculating two-dimensional images, each corresponding to a transmissive display apparatus, of a display object and a background from image information of the display object and the background;

brightness value determination means for comparing a brightness value of the display object with another brightens value; and transparency value calculation means for calculating a brightness value of each two-dimensional image of the display object and the background based on the two-dimensional images calculated by the two-dimensional image calculation means and depth information of the display object and the background;

wherein, when it is determined that the brightness value of the display object is equal to or greater than a predetermined threshold by the brightness determination means, the transparency value calculation means changes the brightness value of the background to a value less than the brightness value of the display object, and calculates the transparency value of each two-dimensional image of the background based on the changed brightness value according to depth information of the display object and sets transparency values of the two-dimensional images of the display object to be the same.

* * * * *